United States Patent
Sakai et al.

[11] Patent Number: 5,698,128
[45] Date of Patent: Dec. 16, 1997

[54] MICROWAVE OVEN WITH A PROJECTION FOR UNIFORM HEATING WITHIN THE CAVITY

[75] Inventors: Haruo Sakai, Hikone; Hiroyuki Uehashi, Koka-gun; Kayo Sakata, Yasu-gun; Masaru Noda, Hikone; Yoshiharu Omori, Otsu; Katsuaki Hayami, Kyoto; Masaharu Katayama, Otsu, all of Japan

[73] Assignee: Sanyo Electric Co., Osaka, Japan

[21] Appl. No.: 503,082

[22] Filed: Jul. 17, 1995

[30] Foreign Application Priority Data

Mar. 13, 1995 [JP] Japan ................................. 7-053058

[51] Int. Cl.$^6$ ................................................ H05B 6/74
[52] U.S. Cl. ..................... 219/745; 219/728; 219/754; 219/756
[58] Field of Search ........................... 219/745, 728, 219/754, 756, 763

[56] References Cited

U.S. PATENT DOCUMENTS 3,218,429  11/1965  Lenart ........................... 219/745
3,461,260  8/1969   Bremer ........................... 219/745
3,946,188  3/1976   Derby ............................ 219/728
4,771,155  9/1988   Yangas .......................... 219/745

FOREIGN PATENT DOCUMENTS 212936     3/1987   European Pat. Off. .
2 663 110  12/1991  France ........................... 219/745
1515156    7/1969   Germany .
47-34553   12/1972  Japan .
48-24206   7/1973   Japan .

OTHER PUBLICATIONS

European Search Report No. EP95111452 completed Dec. 4, 1996.

Primary Examiner—Philip H. Leung
Attorney, Agent, or Firm—Beveridge, DeGrandi, Weilacher & Young, LLP

[57] ABSTRACT

A microwave oven in which a plurality of projections are formed on an interior surface of a cavity for reflection and distribution of microwaves. The plurality of projections are dispersedly arranged so that neighboring projections do not contact each other. With this arrangement, microwaves can be efficiently distributed within the cavity, since the interior surface of the cavity does not have any depressions which would converge microwaves.

28 Claims, 30 Drawing Sheets

F I G. 15
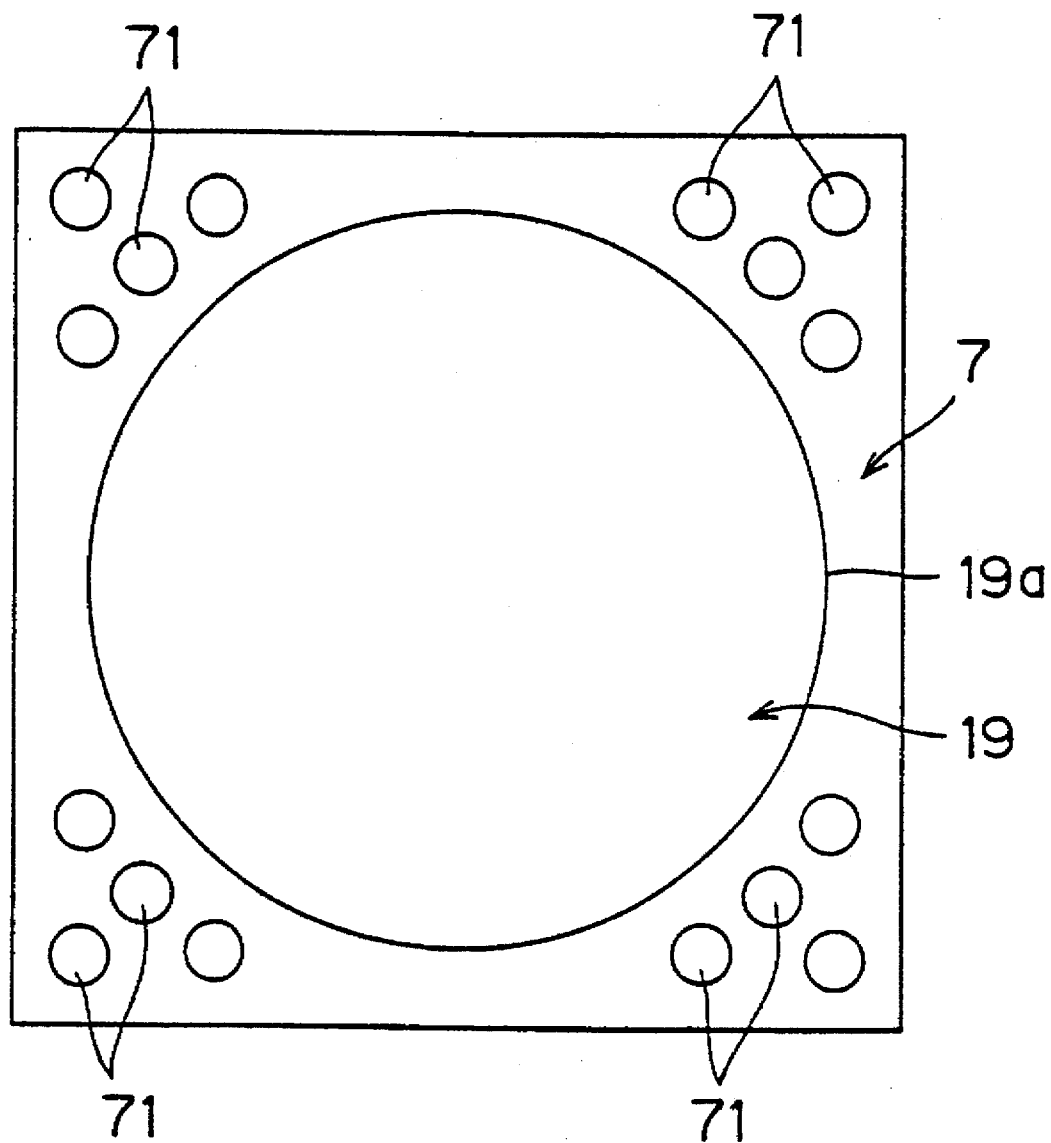

F I G. 17
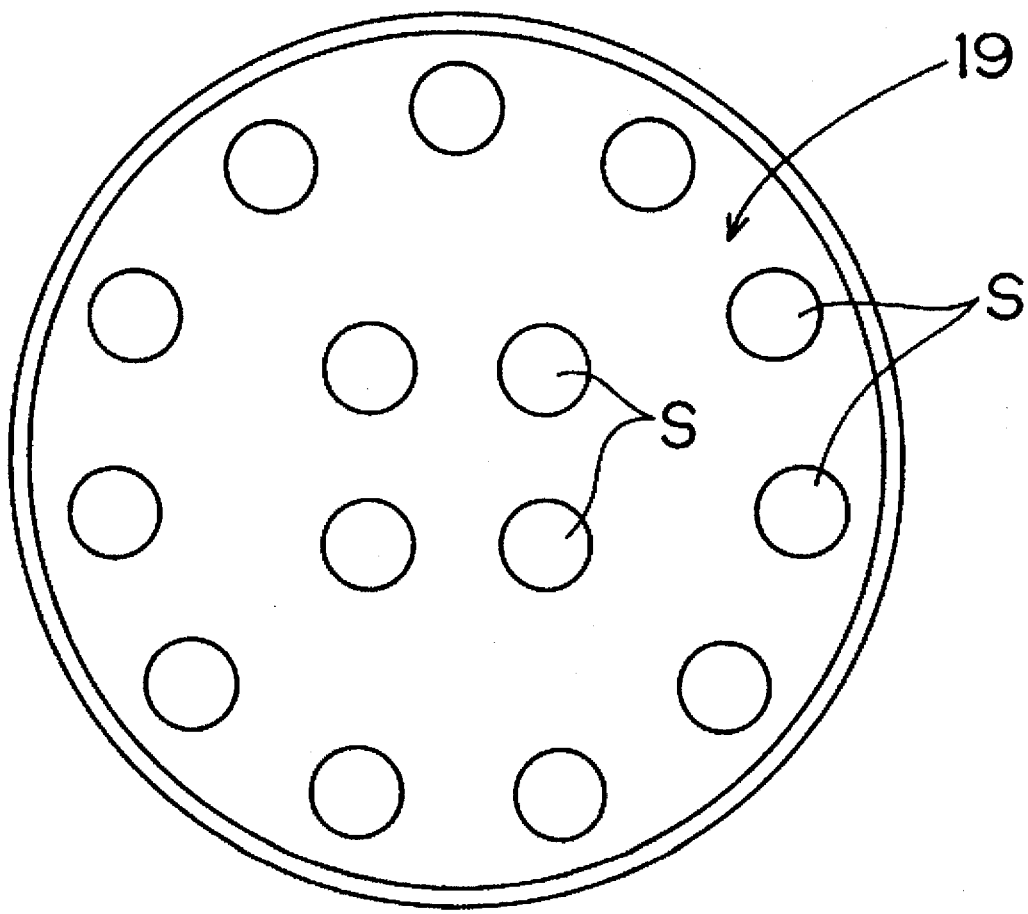

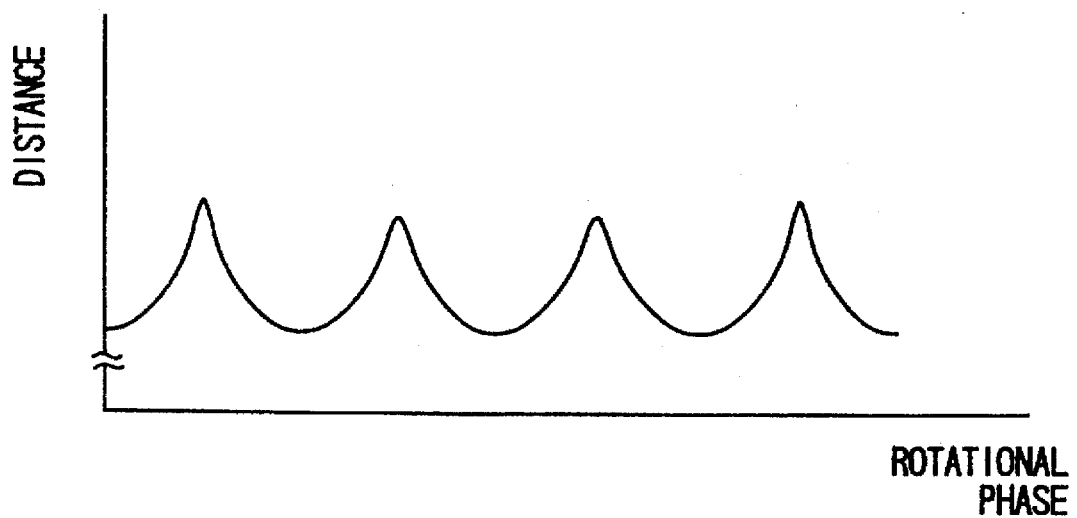
F I G. 37

MICROWAVE OVEN WITH A PROJECTION FOR UNIFORM HEATING WITHIN THE CAVITY

BACKGROUND OF THE INVENTION

1. Field of the Invention

The present invention relates to microwave ovens for heating food in a cooking cavity thereof by microwave energy.

2. Description of Related Art

Microwave ovens are adapted to heat a food body in an electric field generated by introducing microwaves to the cooking cavity thereof.

However, standing microwaves generated in the cavity makes it difficult to generate a uniform electric field. This results in a spot-to-spot variation in the density of electric field lines in the cavity which prevents uniform heating of food.

To ensure uniform heating or to prevent local overheating, conventional microwave ovens are provided with a stirrer at a microwave supplying port for introducing microwaves into the cavity in order to change the incident angles of microwaves, thereby changing the positions of the standing microwaves. Alternatively, the orientation of a food body placed on a pan is changed by rotating the pan. However, such conventional microwave ovens cannot satisfactorily ensure uniform heating of food.

Japanese Examined Utility Model Publication No. 48-24206 (1973) and Japanese Unexamined Utility Model Publication No. 47-34553 (1972) disclose microwave ovens in which depressions and projections forming undulations are formed on interior surfaces of the cavity thereof for irregular reflection of microwaves.

However, the microwave ovens cannot efficiently distribute microwaves throughout the cavity due to convergence of microwaves reflected on the depressions, failing in uniform heating. In addition, it is not easy to clean the interior of the cavity having such depressions.

Microwaves are supplied into the cavity through a microwave supplying port formed, for example, on a side wall. In a case that the projections are provided on the interior surfaces for irregular reflection of microwaves, the positional relationship between the projections and the microwave supplying port is important in order to uniformly distribute microwaves within the cavity by irregular reflection. In the microwave ovens disclosed in the aforesaid literatures, however, enough consideration is not given to the positional relationship between the projections and the microwave supplying port. Therefore, these microwave ovens cannot satisfactorily ensure uniform heating.

Further, the aforesaid literatures do not include a conception to provide undulations on the bottom face of the cavity. Therefore, microwaves emitted on the bottom face cannot be efficiently utilized for the heating of food.

In general, microwave ovens are provided with an infrared heater, for example, on the ceiling of a cooking cavity thereof for thermal-oven heating. For thermal-oven heating, a so-called square tray is provided in addition to an ordinary pan for the microwave heating. The square tray on which an object to be heated is placed is inserted into a position higher than the ordinary pan.

The square tray is guided by guide rails disposed depthwise on the right and left side walls of the cavity allow the square tray to be removably inserted into the cavity.

Where a microwave oven adapted to receive such a square tray is provided with depressions and projections on side walls of the cavity thereof, the projections may interfere with the square tray, thereby preventing smooth insertion and removal of the square tray.

SUMMARY OF THE INVENTION

It is an object of the present invention to provide a microwave oven capable of uniformly heating an object in a cavity thereof.

It is another object of the present invention to provide a microwave oven capable of uniformly heating an object and yet allowing for easy cleaning.

It is further another object of the present invention to provide a microwave oven capable of uniformly distributing microwaves supplied through a microwave supplying port throughout a cavity thereof by irregular reflection of microwaves to uniformly heat an object.

It is still another object of the present invention to provide a microwave oven capable of efficiently utilizing microwaves emitted on the bottom face of a cavity thereof to uniformly heat an object.

It is yet another object of the present invention to provide a microwave oven capable of uniformly heating an object, and yet allowing for smooth insertion of a tray for thermal-oven heating.

It is further another object of the present invention to provide a microwave oven capable of uniformly heating an object by subjecting the object to frequent alternation of high-intensity and low-intensity microwave radiations.

In accordance with the present invention, there is provided a microwave oven including: a cavity defined by partition plates for accommodating therein an object to be heated; a microwave generator for supplying microwaves into the cavity; and a plurality of projections bulged into the cavity and dispersedly formed on interior surfaces of the partition plates in such an arrangement that neighboring projections do not contact each other, for reflecting the microwaves supplied from the microwave generator to distribute the microwaves within the cavity.

With this construction, since the partition plates of the cavity are not formed with any depressions which may converge microwaves, the microwaves can be efficiently distributed within the cavity, and the interior of the cavity can be easily cleaned.

The plurality of projections preferably include rear-face projections formed on a rear plate. In this case, it is preferable that the occupancy rate of the rear-face projections in a cross-section taken along the longitudinal direction of the rear plate is relatively large in a central region with respect to the transverse direction of the rear plate, so that sufficient microwaves gathering onto the central region with respect to the transverse direction of the rear plate can be reflected on the rear-face projections and distributed throughout the cavity. Thus, an object in the cavity can be uniformly heated.

Further, it is preferable that a rear-face projection which is larger than the other rear-face projections is disposed in the center of the rear plate.

The large-size rear-face projection receives and reflects a large amount of microwaves, thereby distributing sufficient microwaves throughout the cavity.

It is preferable that the large-size rear-face projection disposed in the center of the rear plate is approximately of an elliptical shape elongated along the longitudinal direction of the rear plate. Since the shape of the large-size rear-face projection is adapted for the shape of the cavity, microwaves reflected thereon can be uniformly distributed throughout the cavity.

Where guide rails for guiding a tray removably inserted into the cavity are respectively provided on opposite side plates defining the cavity, positioning abutment members adapted to abut against the inserted tray for restricting an insertion position of the tray is provided at the edge of the rear plate to establish a clearance for discharge prevention between each of the apexes of the rear-face projections and the tray. This prevents the discharge between the tray and rear-face projections.

Each of the rear-face projections is preferably formed into a convexly curved surface having neither step nor angularity, e.g., a semi-ellipsoidal surface, semi-spherical surface or paraboloidal surface. This increases the distribution efficiency of microwaves.

Further, it is preferable that the partition plates include a first face formed with the microwave supplying port for supplying microwaves into the cavity and a second face disposed adjacent to the first face, and that the second face is formed with at least one projection bulged into the cavity. In this case, it is preferable that the distance between the center of the projection and the boundary line of the first and second faces is not greater than one half the wavelength of the microwaves.

The present inventors have found that, where the projection for irregularly reflecting microwaves is provided on the second face disposed adjacent the first face formed with the microwave supplying port, the projection should be located in an optimal position to uniformly distribute the microwaves reflected thereon within the cavity. More specifically, if the projection is located in a position spaced apart from the boundary line of the first and second faces by not greater than one half the wavelength of the microwaves, the microwaves reflected thereon can be uniformly distributed within the cavity, thereby ensuring uniform heating of an object.

By forming the projection into a semi-spherical surface, the microwaves reflected thereon can be efficiently distributed within the cavity. In this case, the diameter of the projection is preferably approximately one half the wavelength of the microwaves to enhance the distribution efficiency of microwaves.

Where the microwave oven includes a shaft projecting from the center of a bottom plate defining the cavity and adapted to be rotated by a driving means disposed outside the cavity, and a metallic pan support coupled to the shaft for rotation and adapted to support a pan on which an object to be heated is placed, a plurality of bottom projections bulged into the cavity are formed on the bottom plate in a region outside the periphery of the pan support as viewed from the top.

With this arrangement, the projections formed on the bottom plate allow microwaves contacting the bottom plate to be irregularly reflected and distributed throughout the cavity. Therefore, the microwaves emitted on the bottom plate in the region outside the periphery of the metallic pan support can be efficiently utilized to uniformly heat an object. Where the pan is made of a nonmetallic material (i.e., the pan is pervious to microwaves), bottom projections may be arranged in regions both inside and outside the periphery of the pan (as viewed from the top) on the bottom plate, thereby irregularly reflecting and distributing a larger amount of microwaves within the cavity. In particular, bottom projections arranged in a region inside the periphery of the pan allow an object placed on the pan to be irradiated with microwaves from the under side thereof, thereby ensuring more uniform heating of the object.

Where the pan is made of a metal, microwaves do not reach a region below the metallic pan and, therefore, it is sufficient that bottom projections are formed only in a region outside the periphery of the pan on the bottom plate.

By forming each of the bottom projections into a convexly curved surface having neither step nor angularity, e.g., a semi-ellipsoidal surface, semi-spherical surface or paraboloidal surface, the distribution efficiency of microwaves can be enhanced.

Preferably, right and left side plates defining the cavity are each provided with a plurality of side-face projections. With this arrangement, the side-face projections formed on the side plates reflect and uniformly distribute the microwaves throughout the cavity.

Where the right and left plates are respectively provided with guide rails for guiding a tray for thermal-oven heating which is removably inserted into the cavity, the side-face projections are preferably vertically spaced apart from the guide rails by at least a predetermined distance so as not to contact the inserted tray. With this arrangement, the side-face projections are prevented from coming into contact with the tray and, hence, do not interfere with the insertion of the tray.

Alternatively, the distance between the apexes of opposite side-face projections on the side plates may be set greater than the lateral length of the tray to prevent the tray from contacting the side-face projections, whereby the side-face projections do not interfere with the insertion of the tray. In this case, the side-face projections can be provided in the vicinity of the guide rails and, therefore, more widely arranged on the side plates. Thus, a larger number of microwaves can be distributed within the cavity for more uniform heating.

By forming each of the side-face projections into a convexly curved surface having neither step nor angularity, e.g., a semi-ellipsoidal surface, semi-spherical surface or paraboloidal surface, the distribution efficiency of microwaves can be enhanced.

Where the pan on which an object to be heated is placed is adapted to rotate, undulations are preferably provided on the interior surface of the cavity in the vicinity of the upper surface of the pan around a space to be occupied by the object and undulated in relation to the rotational direction of the pan.

With this arrangement, the distance between the object and the undulation-formed portion on the interior surface of the cavity varies with the rotation of the object. Therefore, the object is subjected to frequent alternation of high-intensity and low-intensity radiations of microwaves reflected on the interior surface of the partition plates. Thus, the object can be uniformly heated.

The undulations are preferably provided on the rear plate, right side plate and left side plate. Thus, the object on the pan can be more efficiently subjected to frequent alternation of high-intensity and low-intensity microwave radiations. By forming a plurality of projections on the partition plates to provide the undulations, the distribution efficiency of microwaves can be enhanced. Further, by forming each of the projections into a convexly curved surface having neither step nor angularity, the distribution efficiency of microwaves can be further enhanced, thereby ensuring more uniform heating.

The foregoing and other objects, features and advantages of the present invention will become more apparent from the following detailed description with reference to the attached drawings.

BRIEF DESCRIPTION OF THE DRAWINGS

FIG. 15 is a schematic plan view illustrating a variation of a bottom plate.

FIG. 17 is a plan view illustrating an arrangement of shaomais shao-mais on a pan in a heating test.

FIG. 37 is a graphic representation illustrating the relationship between the distance from an object to be heated to each wall and the rotational phase of a pan observed in a conventional microwave oven.

DETAILED DESCRIPTION OF THE PREFERRED EMBODIMENTS

Figure 1:
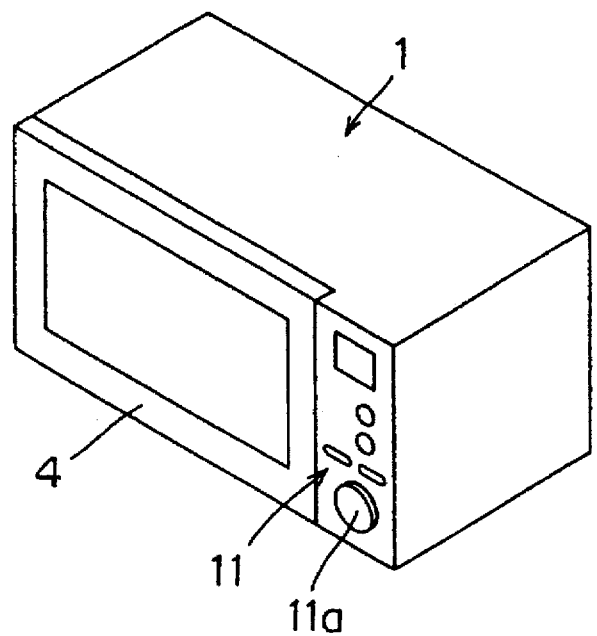
FIG. 1 is a schematic perspective view of a microwave oven with the door thereof being closed in accordance with a first embodiment of the present invention.
Figure 2:
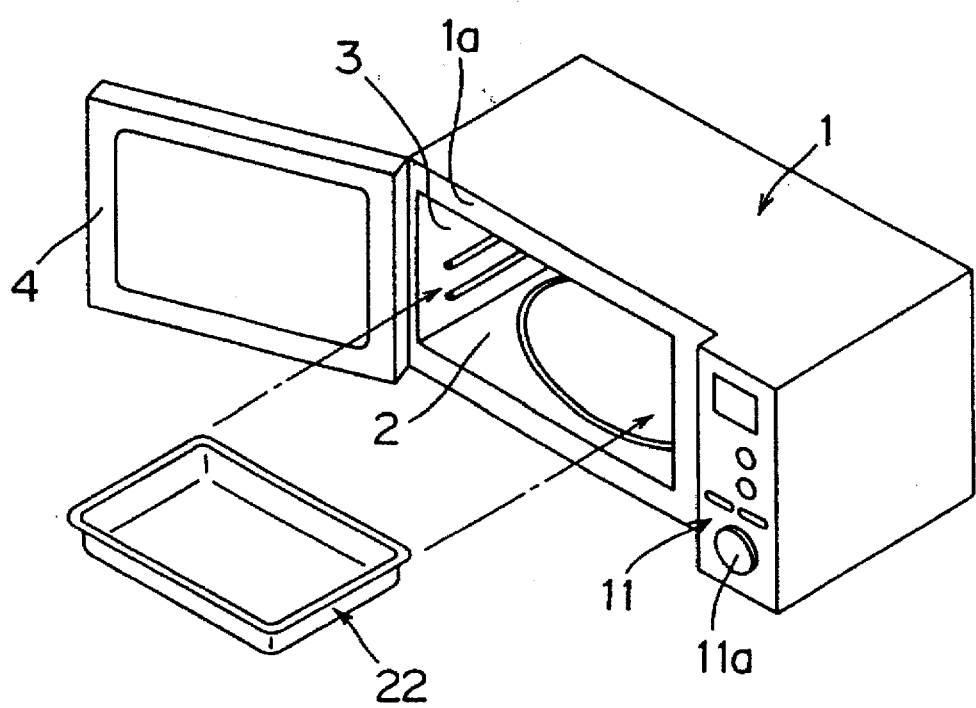
FIG. 2 is an exploded perspective view of the microwave oven with the door thereof being open and a square tray to be inserted therein.
Figure 3:
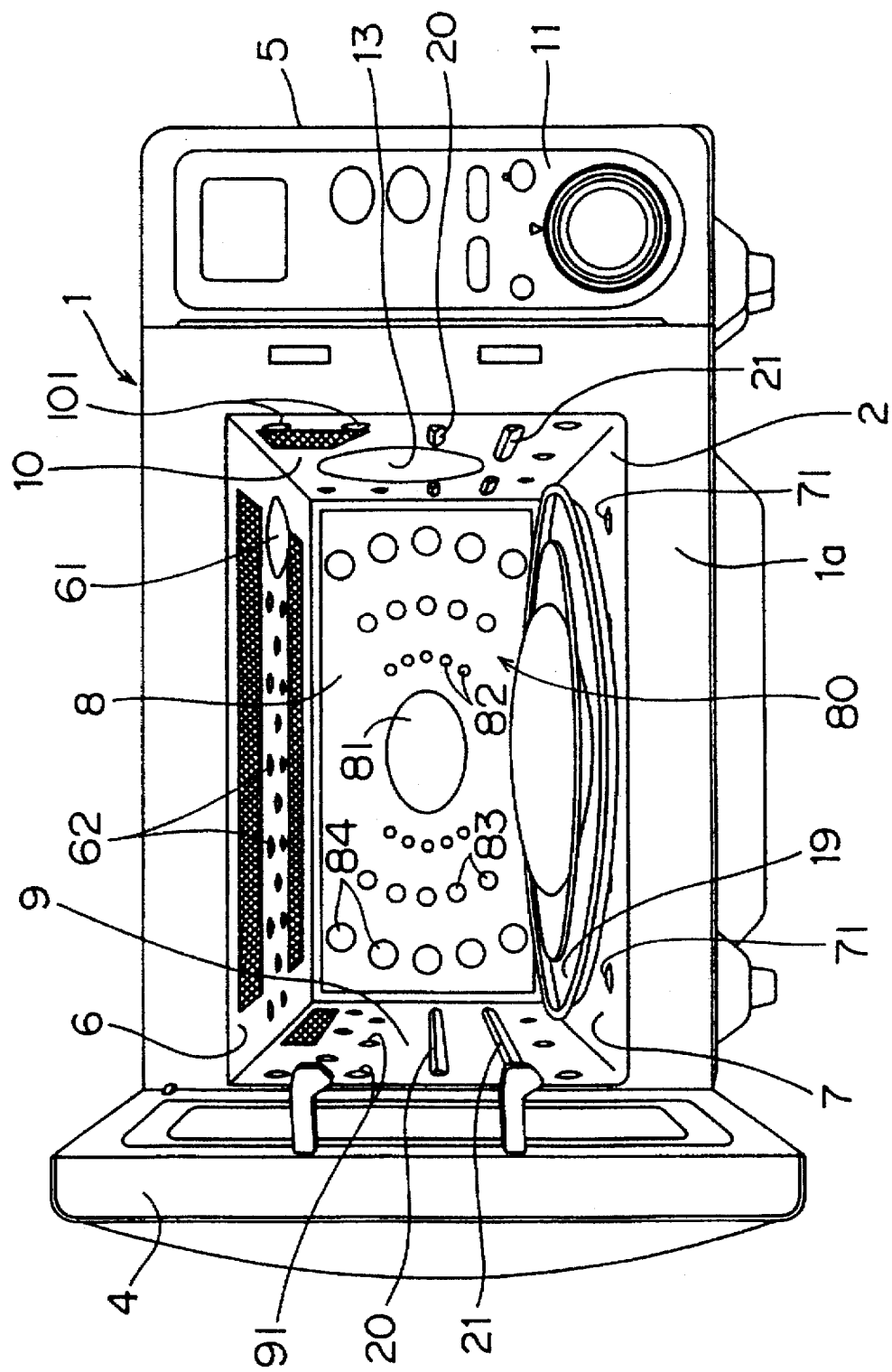
FIG. 3 is a front view of the microwave oven with the door thereof being open.
Figure 4:
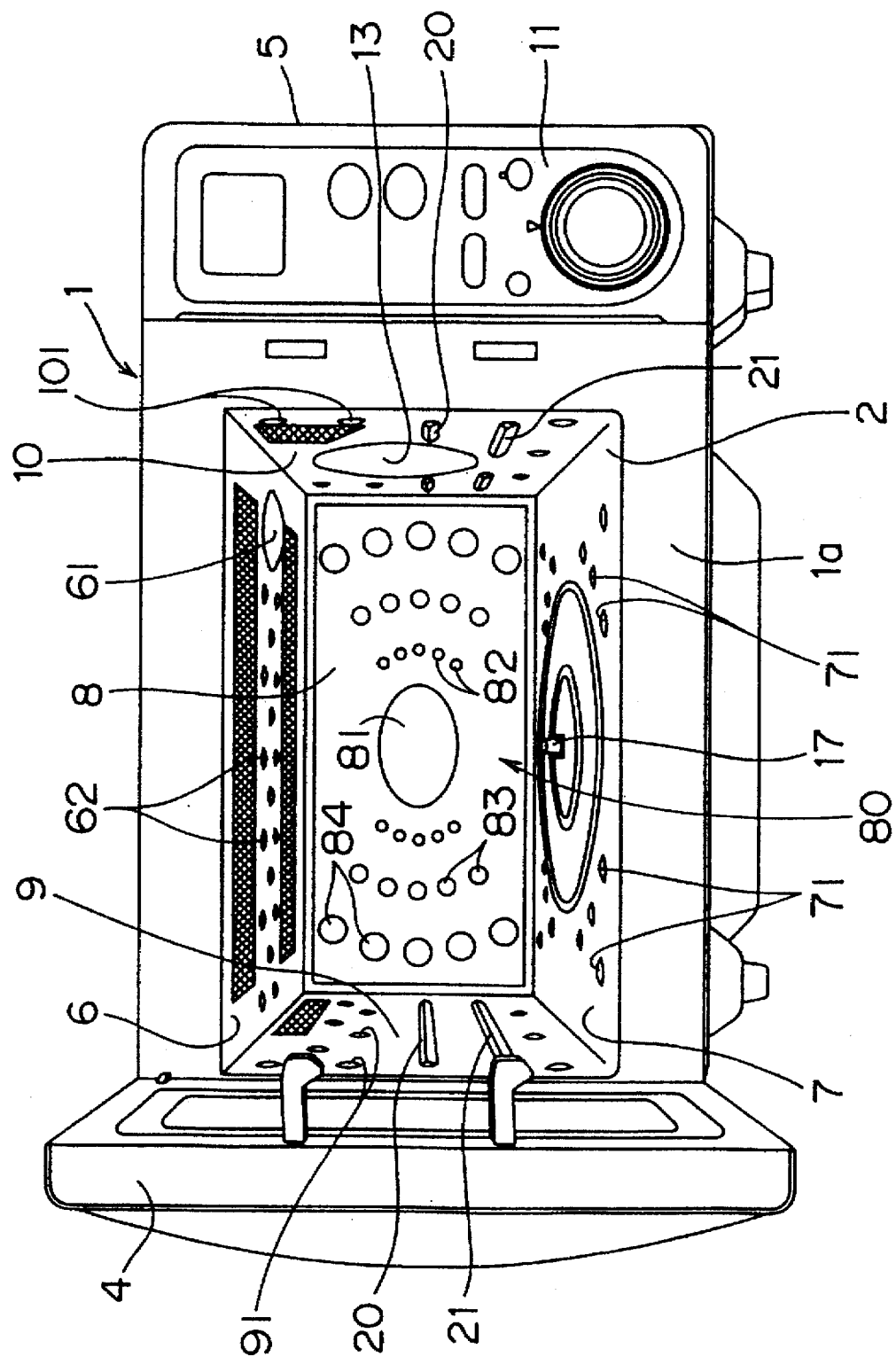
FIG. 4 is a front view of the microwave oven with the door thereof being open and the tray being removed therefrom.

FIG. 1 is a schematic perspective view of a microwave oven with a door thereof being closed in accordance with a first embodiment of the present invention. FIG. 2 is an exploded perspective view of the microwave oven in a state where a square tray is just to be inserted into the microwave oven with the door thereof being open. FIG. 3 is a front view of the microwave oven in a state where a food body on a dish is placed on a pan in the microwave oven with the door thereof being open. FIG. 4 is a front view of the microwave oven in a state where the pan is removed from the microwave oven with the door thereof being open.

Referring to FIGS. 1 and 2, the microwave oven includes an oven body 1 having a laterally elongated cavity 2, and a door 4 mounted on a front portion 1a of the oven body 1. The door 4 is adapted to cover and uncover an opening 3 of the cavity 2 formed in the front portion 1a of the oven body 1. An operation panel 11 having various operation keys 11a for setting a desired cooking mode is disposed adjacent to the door 4 on the front portion 1a. A square tray 22 (shown in FIG. 2) on which an object to be heated is placed is inserted into the cavity 2 as required.

Figure 5:
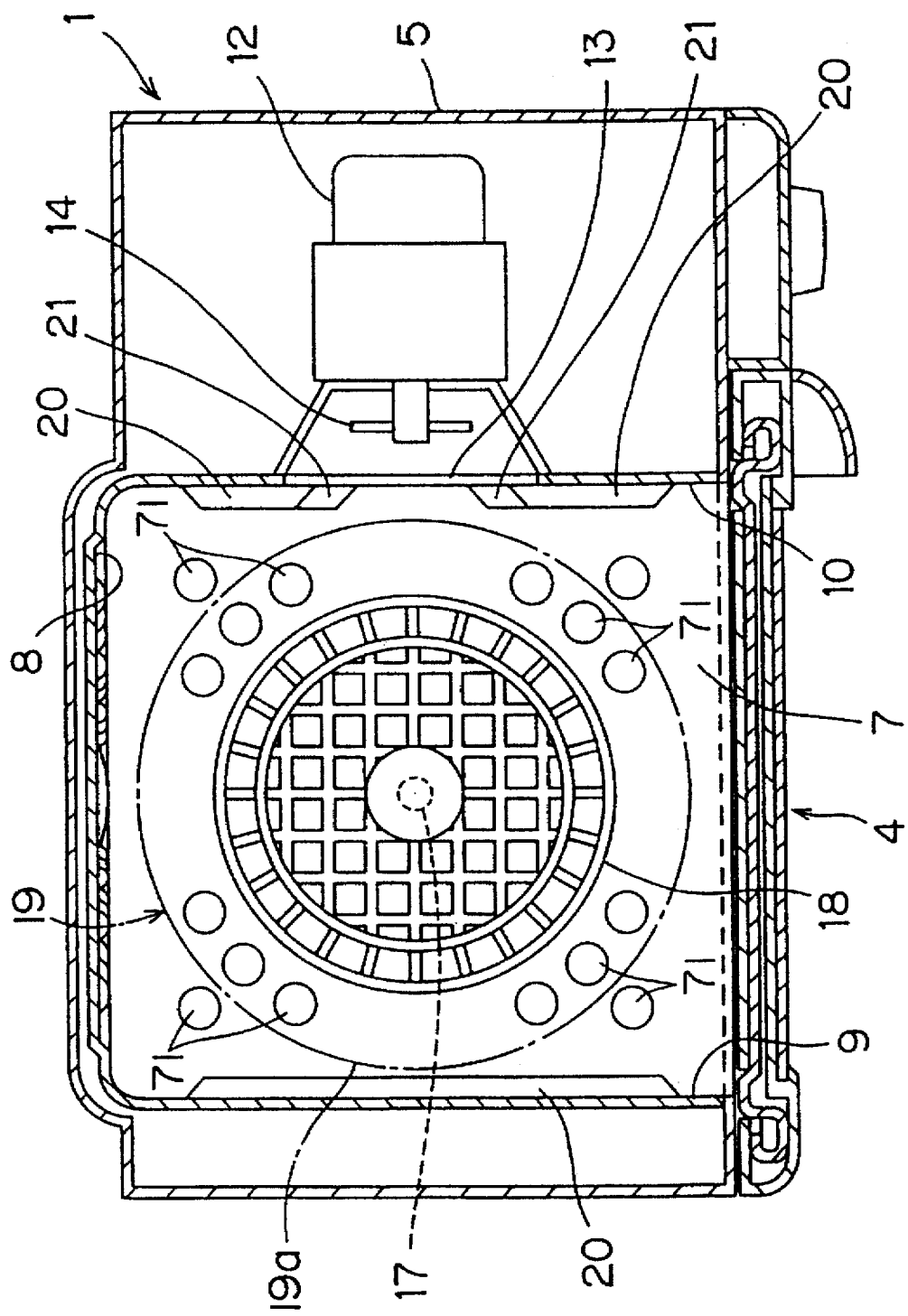
FIG. 5 is a transverse sectional view of the microwave oven.

FIG. 5 is a transverse sectional view of the microwave oven. Referring to FIGS. 3, 4 and 5, the oven body 1 has an outer housing 5 defining an exterior surface of the oven body 1, and a ceiling plate 6, bottom plate 7, rear plate 8, left side plate 9 and right side plate 10 serving as partition plates defining the cavity 2 inside the outer housing 5. The cavity 2 is defined by the ceiling plate 6, bottom plate 7, rear plate 8, left side plate 9, right side plate 10 and door 4.

Referring to FIG. 5, there is disposed a magnetron 12, serving as a microwave generator for generating microwaves, in a space between the right side plate 10 and a face of the outer housing 5 facing opposite the ride side plate 10. The microwaves generated by the magnetron 12 are supplied to the cavity 2 via a microwave supplying port 13 formed in the right side plate 10. The microwave supplying port 13 is covered with a mica plate pervious to microwaves. Disposed adjacent to the magnetron 12 is a radiation antenna 14 for radiating the microwaves generated by the magnetron 12 into the cavity 2. In this embodiment, the right side plate 10 and the ceiling plate 6 correspond to a first partition plate defining a first face and a second partition plate defining a second face, respectively.

Figure 6:
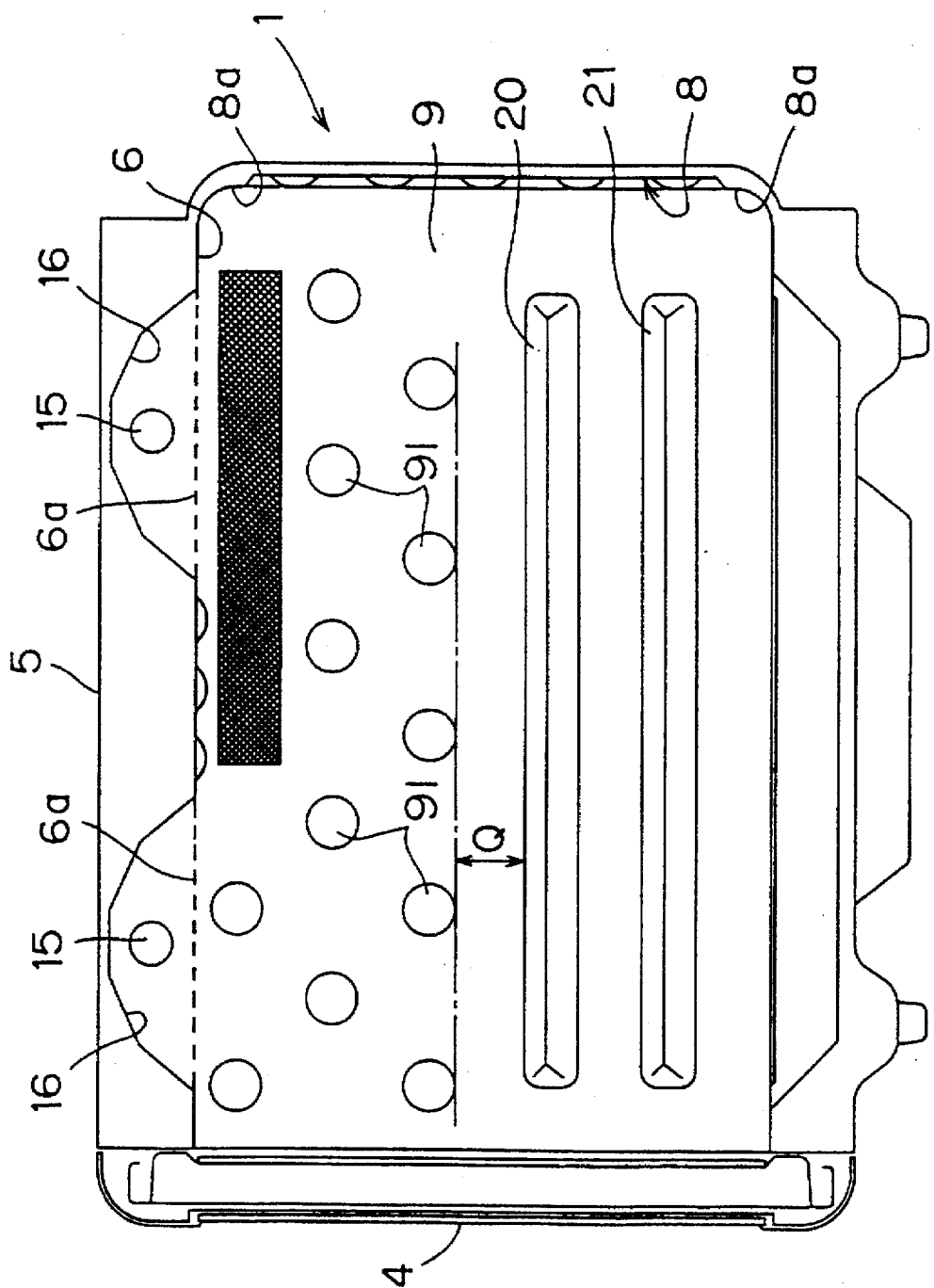
FIG. 6 is a schematic side view illustrating the inside structure of the microwave oven.

FIG. 6 is a schematic side view illustrating the inside structure of the microwave oven. In a space between the ceiling plate 6 and a face of the outer housing 5 facing opposite the ceiling plate 6 are disposed two elongated infrared heaters 15 for thermal-oven heating. Reflection plates 16 for reflecting infrared radiation emitted from the infrared heaters 15 are disposed above the infrared heaters 15. Denoted by reference numeral 6a are perforation portions formed with a multiplicity of perforations.

Figure 7:
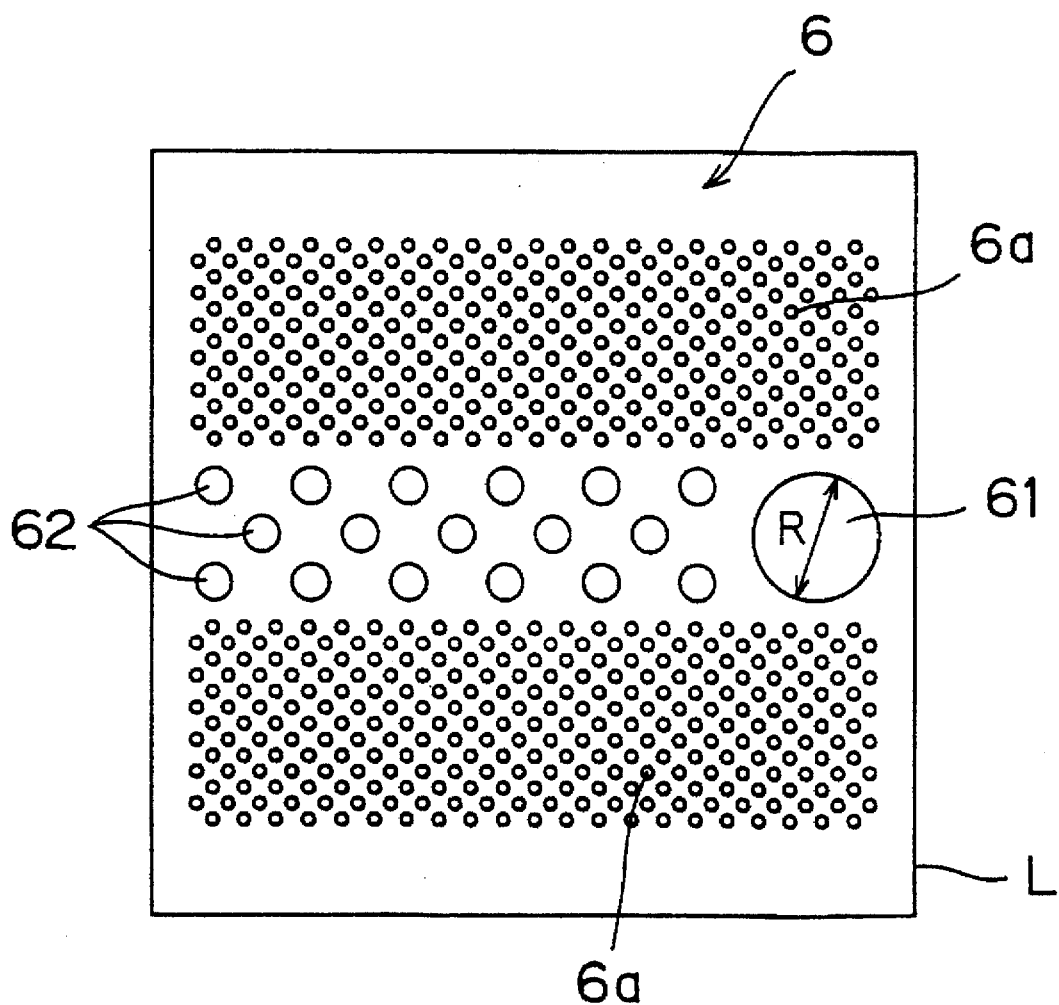
FIG. 7 is a front view of a ceiling plate of the microwave oven.

Referring to FIGS. 3, 4 and 7, a large-size projection 61 and a plurality of small-size projections 62 are disposed in a central region with respect to the depth direction of the ceiling plate 6. The large-size projection 61 is disposed adjacent to the microwave supplying port 13, and the small-size projections 62 are laterally disposed in three rows without overlapping with the perforation portions 6a to introduce infrared radiation into the cavity 2 from the infrared heaters 15.

Figure 8:
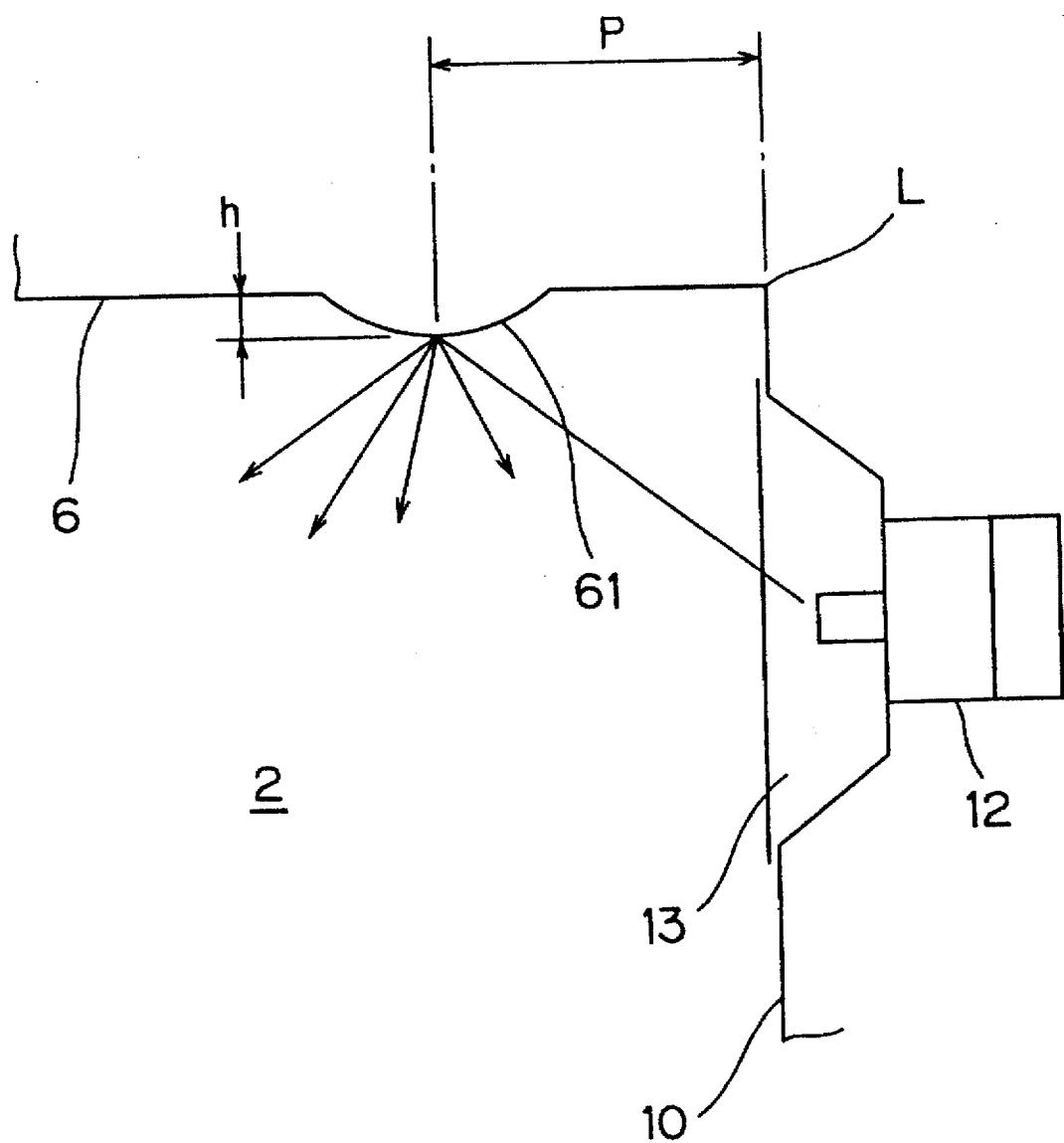
FIG. 8 is a schematic side view illustrating the positional relationship between a large-size projection and microwave supplying port in the cavity.

The projections 61 and 62 are formed into exposed semi-spherical surfaces and arranged so as not to contact each other. Referring to FIG. 8, the large-size projection 61 has a height h of 4.5 mm and a diameter R of 60 mm which equals one half the wavelength of the microwaves, and is disposed such that the distance P between the center of the large-size projection 61 and a boundary line L of the ceiling plate 6 and right side plate 10 is 60 mm which equals one half the wavelength of the microwaves.

Figure 9:
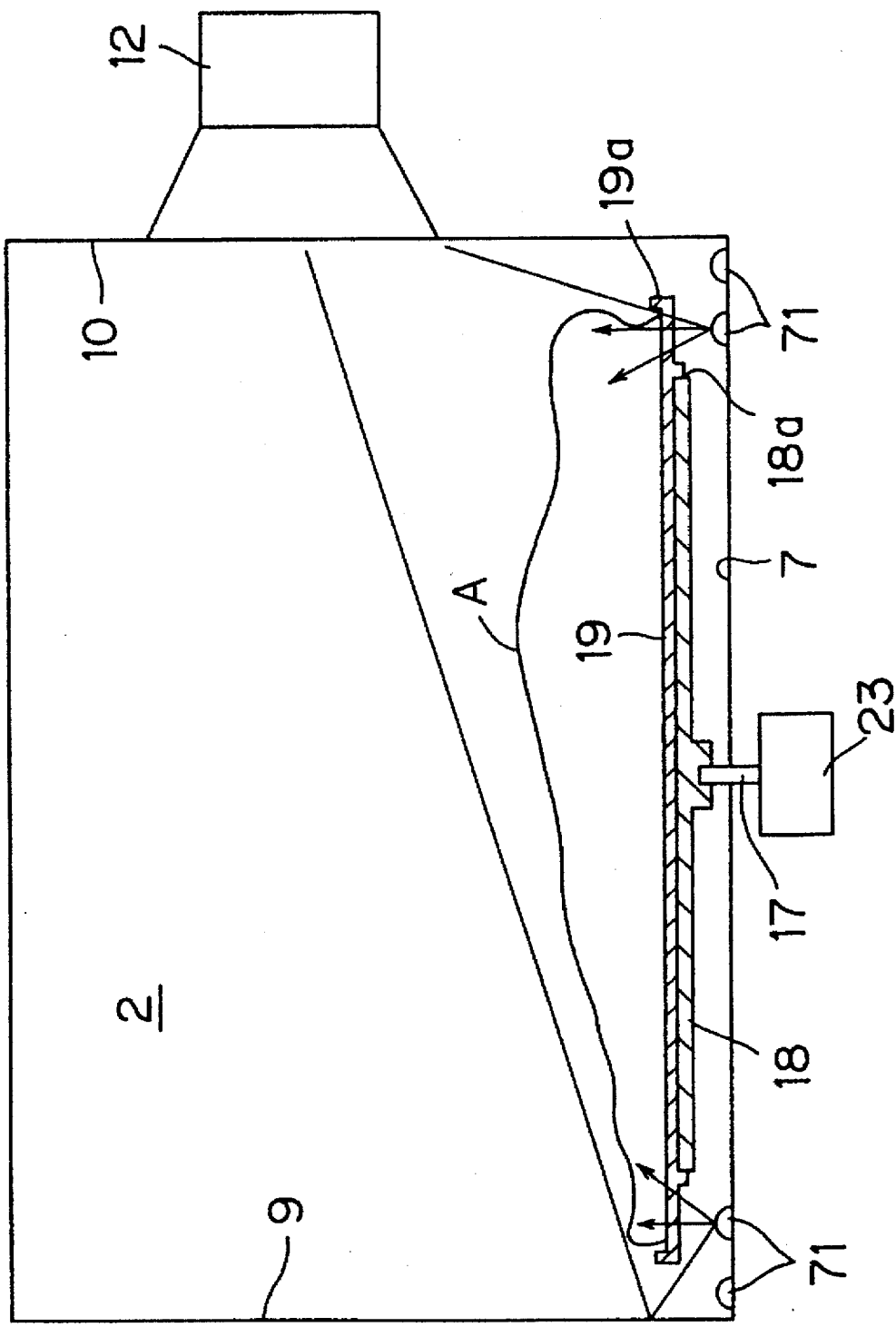
FIG. 9 is a schematic vertical sectional view illustrating the inside structure of the cavity.

Referring to FIGS. 4, 5 and 9, a shaft 17 adapted to be rotated by a motor 23 (see FIG. 9) disposed outside the cavity 2 projects into the cavity 2 from the center of the bottom plate 7. The shaft 17 is coupled to a metallic grating pan support 18 for integral rotation. A circular pan 19 (so-called turntable shown in FIGS. 1, 3 and 9, and shown in phantom FIG. 5) made of a nonmetallic material such as glass on which a food body or the like is to be placed is mounted on the pan support 18. The pan 19 has a diameter a little greater than that of the pan support 18.

Referring to FIGS. 3, 5 and 9, a plurality of semi-spherical bottom projections 71 bulged into the cavity 2 are formed on the bottom plate 7 in regions outside and inside the periphery of the pan 19. Some of the plural bottom projections 71 are disposed on the bottom plate 7 in a region outside the periphery 19a of the pan 19, and the other bottom projections are disposed in a region inside the periphery 19a of the pan 19 and outside the periphery 18a of the pan support 18. These bottom projections 71 are dispersedly arranged so as not to contact each other.

Referring to FIGS. 3, 4 and 6, upper and lower guide rails 20 and 21 are disposed on the left side plate 9 and right side plate 10. These guide rails 20 and 21 are adapted to support the square tray 22 to be used for thermal-oven heating, for example, when gratin or the like is cooked. As required, the square tray 22 is inserted into the cavity 2, guided by the guide rails 20 or 21. The guide rails 20 and 21 on the right side plate 10 are each divided into two pieces by the interference of the microwave supplying port 13.

Figure 10:
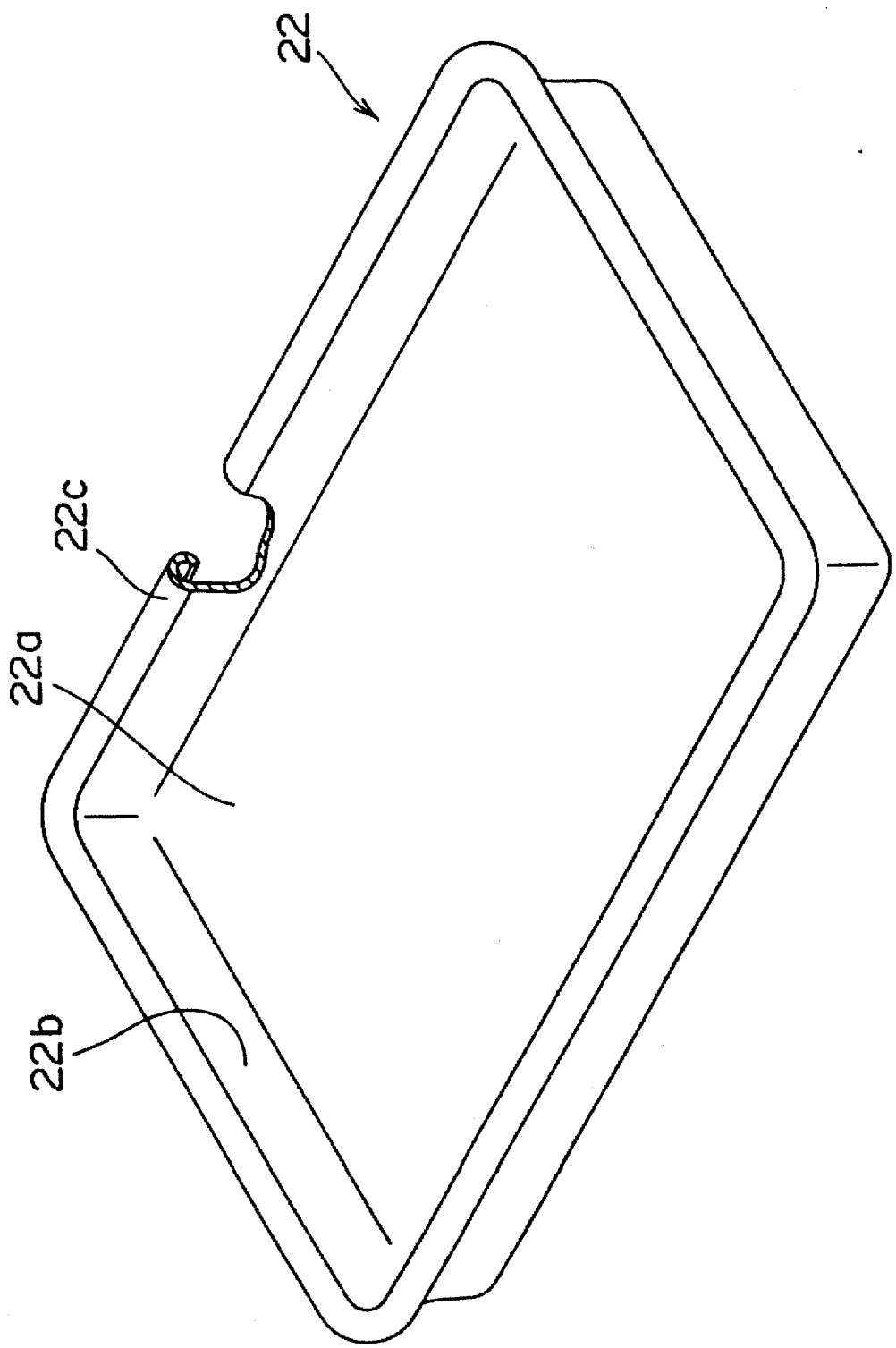
FIG. 10 is a partially cut-away perspective view of the square tray.

Referring to FIG. 10, the square tray 22 is shaped in a top-open box configuration, and has a rectangular bottom face 22a, peripheral walls 22b upstanding from the four sides of the bottom face 22a and a circumferential flange 22c formed at upper edges of the peripheral walls 22b. The circumferential flange 22c is curved such that the edge thereof faces opposite the peripheral walls 22c. When the square tray 22 is inserted into the cavity 2, the circumferential flange 22c is slidably supported by the guide rails 20 or 21.

Figure 11:
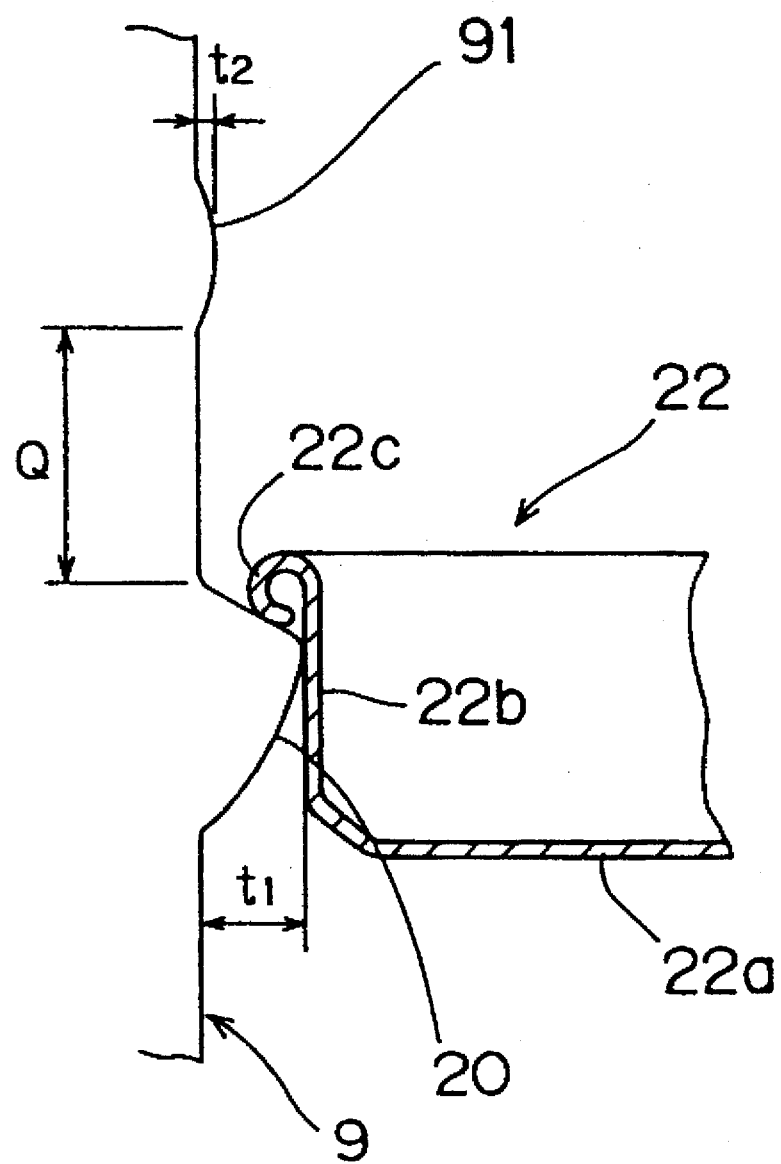
FIG. 11 is a schematic view of the square tray guided by a guide rail.

Referring to FIGS. 6 and 11, a plurality of semi-spherical side-face projections 91 bulged into the cavity 2 are dispersedly arranged on the left side plate 9 in a region upwardly spaced apart from the upper guide rail 20 by more than a predetermined distance Q. On the right side plate 10 are disposed a plurality of side-face projections 101 in substantially the same arrangement except that the interference with the microwave supplying port 13 is avoided (see FIGS. 3 and 4). The side-face projections 91 and 101 are dispersedly arranged so that neighboring projections do not contact each other.

The distance Q is determined so that the square tray 22 guided by the upper guide rails 20 does not contact the side-face projections 91, as shown in FIG. 11.

The projection height t1 of the guide rails 20 or 21 into the cavity 2 is, for example, 6.5 mm. The side-face projections 91 and 101 have a projection height of 1 mm and a diameter of 15 mm, for example.

Figure 12:
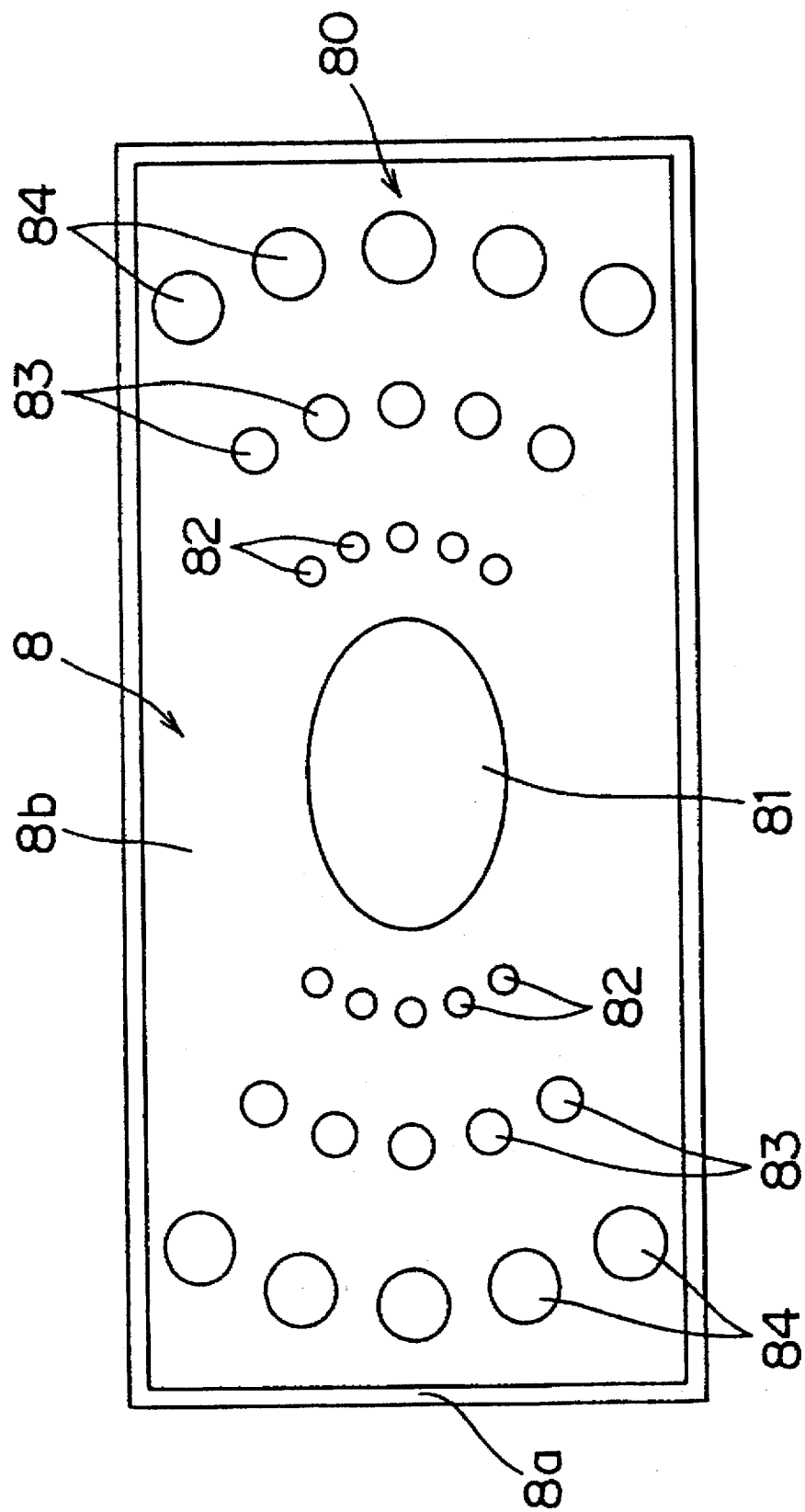
FIG. 12 is a front view of a rear plate.

Referring to FIG. 12, the rear plate 8 has a peripheral portion 8a of a frame extending along the periphery thereof, and a main face 8b surrounded by the peripheral portion 8a and rearwardly recessed therefrom.

Right and left sides of the peripheral portion 8a of the rear plate 8 serve as positioning abutment members adapted to abut against the square tray 22 inserted into the cavity 2 for restricting the insertion position of the square tray 22. More specifically, the leading edge portion of the circumferential flange 22c of the square tray 22 abuts against the peripheral portion 8a, as shown in FIG. 13 which illustrates a transverse sectional view of the cavity 2 with the square tray 22 inserted therein.

Referring to FIG. 12, a rear-face projection group 80 including a plurality of rear-face projections 81, 82, 83 and 84 bulged into the cavity 2 are formed on the recessed main face 8b. The projection height of these rear-face projections 81 to 84 measured from the main face 8b is preferably about 2 mm to ensure highly efficient irregular reflection of microwaves while avoiding volume reduction of the cavity 2.

Figure 13:
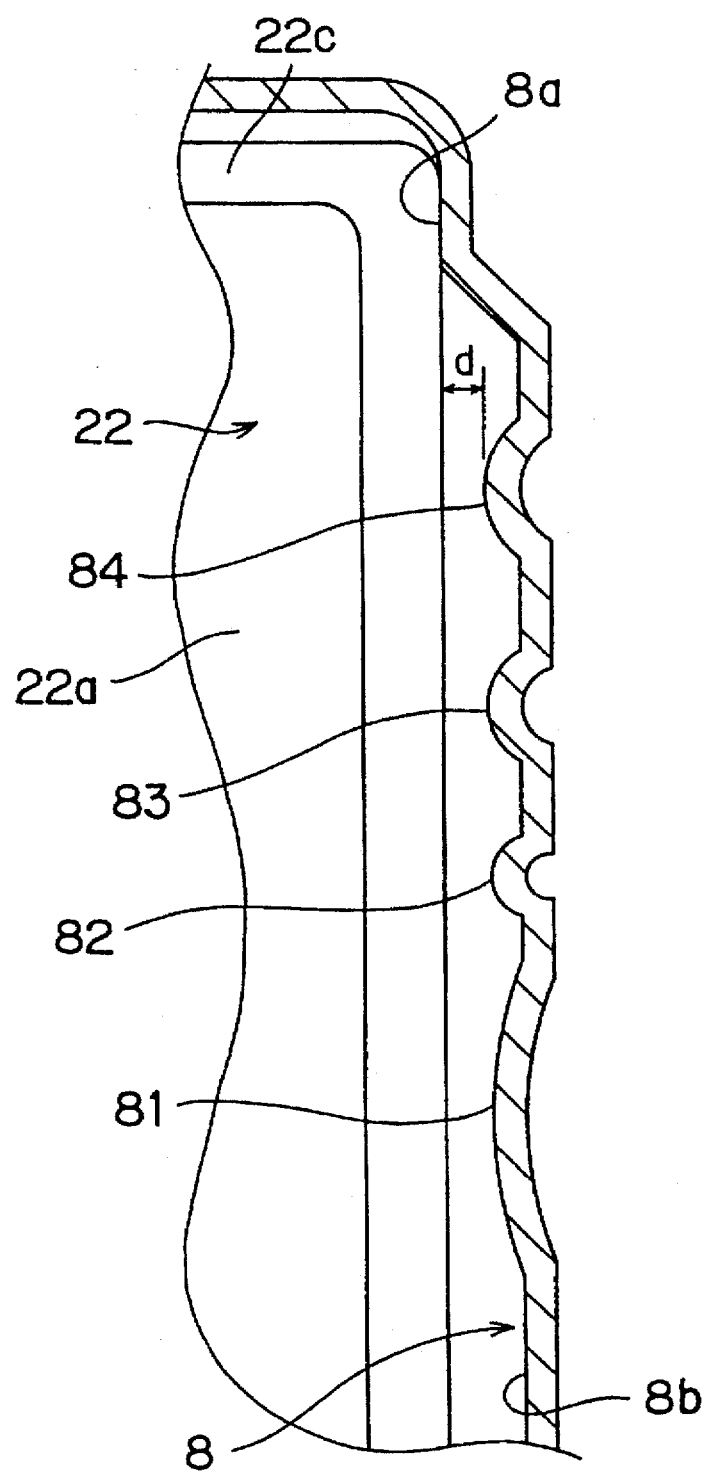
FIG. 13 is a schematic transverse sectional view illustrating the rear plate and square tray in the cavity.
Figure 14:
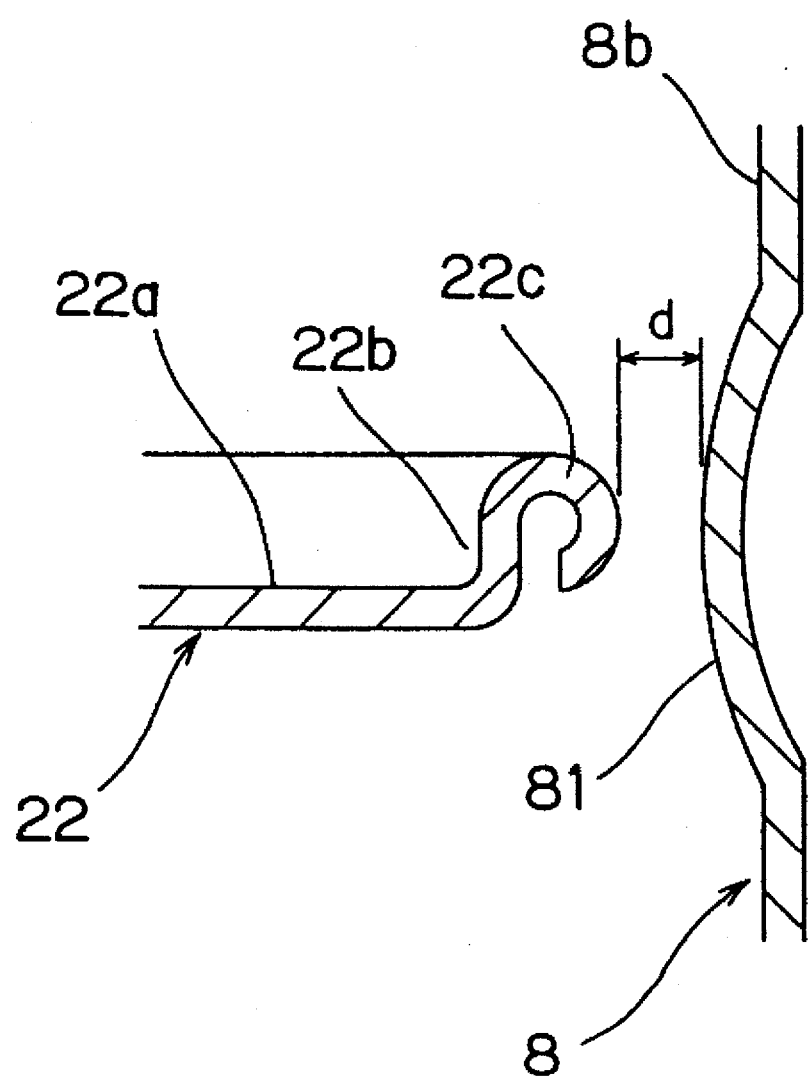
FIG. 14 is a schematic vertical sectional view illustrating the rear plate and square tray in the cavity.

Referring to FIG. 13, the apexes of the respective projections 81, 82, 83 and 84 are rearwardly offset from the peripheral portion 8a by a predetermined distance d, whereby a clearance of the distance d can be established between each of the rear-face projections and the circumferential flange 22c of the square tray 22 inserted into the cavity 2 (see FIG. 14 which illustrates a vertical sectional view of the cavity 2 with the square tray 22 inserted therein). The distance d is such that discharge between the circumferential flange 22c of the square tray 22 and each of the rear-face projections 81 to 84 can be prevented (e.g., about 1 mm). The square tray 22, which is supposed to be used for thermal-oven heating, may be used for microwave heating. With the arrangement of the embodiment, even if the square tray 22 is used for microwave heating by mistake, discharge in the cavity 2 is prevented.

Referring again to FIG. 12, the rear-face projections 81, 82, 83 and 84 are dispersedly arranged such that neighboring rear-face projections do not contact each other. A rear-face projection 81 disposed in the center of the rear plate 8 is configured into a laterally elongated elliptical shape (e.g., major axis: 90 mm, minor axis: 63 mm) which is adapted for the elongated shape of the cavity 2. The rear-face projection 81 has a size larger than the other rear-face projections 82, 83 and 84. The respective projections 82, 83 and 84 are each formed into a semi-spherical surface. The projections 82 are larger than the projections 83, and the projections 83 are larger than the projections 84. For example, the diameters of the projections 82, 83 and 84 are 11 mm, 16 mm and 22 mm, respectively. These projections 82, 83 and 84 are radially arranged from the projection 81 disposed in the center of the rear plate 8 to the right and left sides thereof, but not to the upper and lower sides thereof.

In accordance with this embodiment, the microwave oven enjoys the following advantages:

(1) Since the rear plate 8 does not have any depression which would converge microwaves, but has the rear-face projection group 80, the cavity exhibits a high microwave distribution efficiency and can easily be cleaned. In particular, the laterally elongated arrangement of the rear-face projection group-80 which is adapted for the shape of the cavity 2 makes it possible to irregularly reflect and uniformly distribute microwaves throughout the cavity 2, thereby allowing a food body in the cavity 2 to be uniformly heated.

(2) The large-size rear-face projection 81 disposed in the center of the rear plate 8 receives a large amount of microwaves, which are reflected thereon to be distributed throughout the cavity 2, thereby allowing a food body to be uniformly heated. Further, the laterally elongated shape of the large-size rear-face projection 81 which is adapted for the shape of the cavity 2 serves to uniformly distribute microwaves reflected thereon throughout the cavity 2, thereby allowing a food body to be more uniformly heated.

(3) The occupancy rate of the rear-face projections 81 to 84 in a horizontal line is relatively large in a central region with respect to the vertical direction and smaller in a region downwardly or upwardly more distant from the central region. With this arrangement, sufficient microwaves concentrating onto the central region are reflected on the rear-face projections 81 to 84 and distributed throughout the cavity 2, thereby allowing a food body to be still more uniformly heated.

(4) The rear-face projections are each formed into a convexly curved surface having neither step nor angularity, that is, the central rear-face projection 81 is formed into a semi-ellipsoidal surface and the other projections 82 to 84 are each formed into a semi-spherical surface, whereby the distribution efficiency of microwaves is improved and, hence, a food body can be yet more uniformly heated.

(5) The clearance d is established between the apex of each of the rear-face projections 81 to 84 and the inserted square tray 22 to prevent the discharge therebetween. Therefore, there is no possibility of occurrence of discharge attributable to the rear-face projections 81 to 84.

In accordance with this embodiment, the large-size projection 61 on the ceiling plate 6 is disposed in a position spaced apart from the boundary line L between the ceiling plate 6 and right side plate 10 by a distance not greater than one half the wavelength of the microwaves. Therefore, microwaves reflected on the large-size projection 61 are uniformly distributed within the cavity 2, thereby uniformly heating an object.

The semi-spherical surface of the large-size projection 61 ensures more efficient reflection and distribution of microwaves. Since the large-size projection 61 has a diameter equal to approximately one half the wavelength of the microwaves, the microwave distribution efficiency is further enhanced, thereby ensuring more uniform heating.

The plurality of small-size projections 62 dispersedly arranged on the ceiling plate 6 ensure still more uniform heating.

In accordance with this embodiment, the pan 19 is made of a nonmetallic material and pervious to microwaves. Therefore, the bottom-face projections 71 disposed on the bottom plate 7 in regions outside the periphery of the pan support 18 and inside and outside the periphery 19a of the pan 19 (as viewed from the top) allow for irregular reflection and uniform distribution of a larger amount of microwaves in the cavity 2. In particular, the bottom projections 71 arranged inside the periphery 19a of the pan 19 allow an object A placed on the pan 19 to be irradiated with microwaves from the under side thereof as shown in FIG. 9, thereby ensuring more uniform heating of the object A.

The semi-spherical surface of the bottom projections 71 allows for more efficient distribution of microwaves, thereby ensuring more uniform heating.

Where the pan support 18 is also made of a nonmetallic material in this embodiment, additional bottom projections 71 may be arranged on the bottom plate 7 in a region inside the periphery 18a of the pan support 18.

On the other hand, where the pan 19 is made of a metal, it is sufficient that the bottom projections 71 are provided in the region outside the periphery 19a of the pan 19 on the bottom partition plate 7 as viewed from the top in FIG. 15. In this case, microwaves emitted on the bottom plate 7 can be efficiently utilized for heating, thereby uniformly heating an object.

The shape of the projections formed on the bottom plate 7 is not limited to a semi-spherical surface, but may be any convexly curved surface having neither step nor angularity, e.g., a semi-ellipsoidal or paraboloidal surface.

In accordance with this embodiment, the side-face projections 91 and 101 formed on the left side plate 9 and right side plate 10 reflect and uniformly distribute microwaves throughout the cavity 2, thereby ensuring uniform heating of an object. Since the side-face projections 91 and 101 are spaced apart from the guide rails 20 and 21 by at least the predetermined distance Q, the side-face projections 91 and 101 are prevented from interfering with the square tray 22. Therefore, the side-face projections 91 and 101 do not interfere with smooth insertion and removal of the square tray 22.

Figure 16:
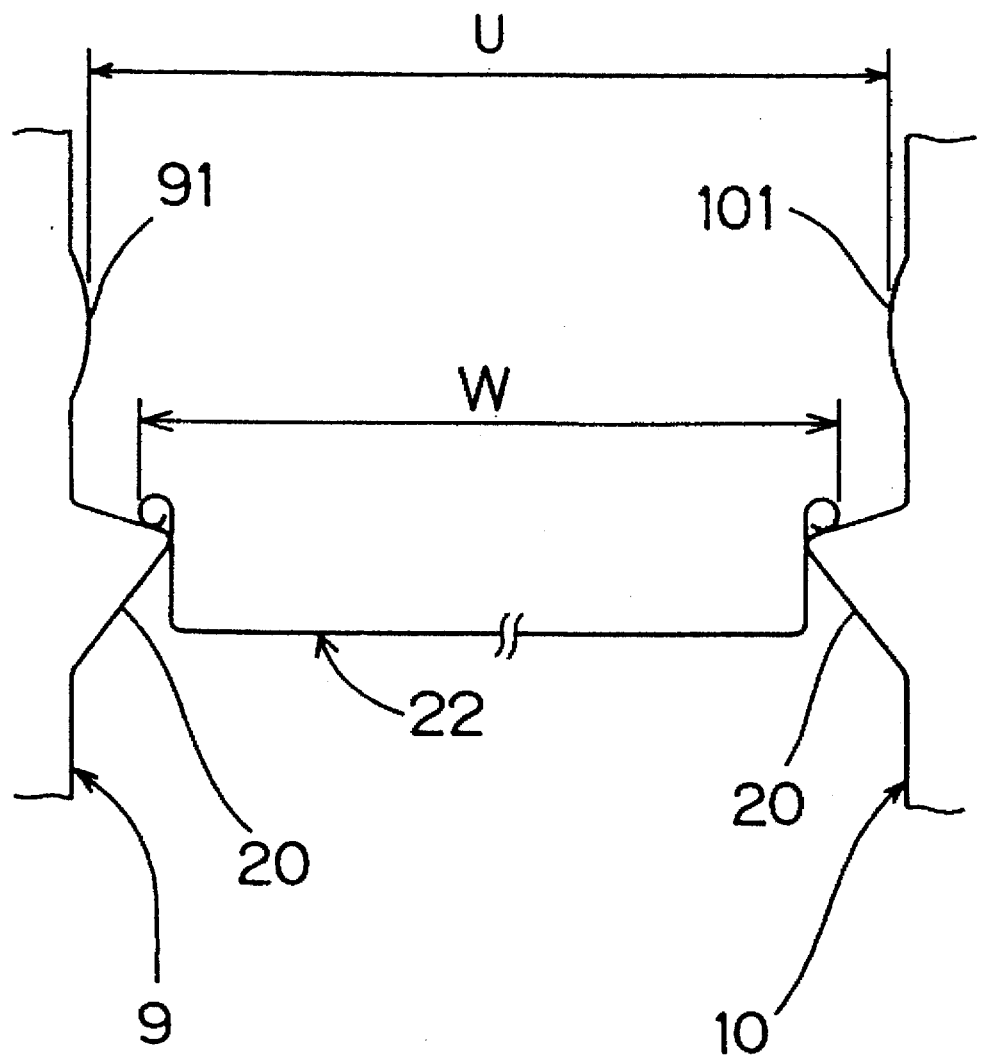
FIG. 16 is a schematic view illustrating the square tray guided by guide rails provided on opposite side plates.

If the distance U between the apexes of opposite side-face projections 91 and 101 on the side plates 9 and 10 is greater than the width W of the square tray 22 as shown in FIG. 16, the side-face projections 91 and 101 may be arranged in the vicinity of the guide rails 20 and 21. Accordingly, the side-face projections 91 and 101 can be more widely arranged on the side plates 9 and 10. Thus, a larger number of microwaves can be distributed throughout the cavity 2, thereby ensuring more uniform heating.

The shape of the projections formed on the side plates 9 and 10 is not limited to the semi-ellipsoidal surface or semi-spherical surface, but may be any convexly curved surface having curvatures in two crossing directions, e.g., a paraboloidal surface.

Heating Test 1

(1) Objects to be tested

Test sample: Microwave oven having a cavity 2 which is defined by a rear plate 8 provided with rear-face projections arranged as shown in FIG. 12 and a ceiling plate 6, bottom plate 7, left side plate 9 and right side plate 10 having no projections.

Reference sample 1: Microwave oven having a rear plate 8 with no projections.

Reference sample 2: Microwave oven having a rear plate 8 provided with projections arranged on the entire surface thereof.

(2) Test procedure

Fifteen shaomais S were placed on a pan 19 in an arrangement as shown in FIG. 17. More specifically, four shaomais S were placed in the central portion of the pan 19, and the other eleven shaomais S were placed circularly around these four shaomais S.

The shaomais S were heated by applying thereto microwaves at a power output of 500 W for five minutes. Thereafter, the temperature of each of the shaomais S was measured, and a difference ΔT between the maximum and minimum temperatures was calculated. The test result is shown below.

Test sample: ΔT=12.4° C.
Reference sample 1: ΔT=26.9° C.
Reference sample 2: ΔT=18.6° C.

This demonstrates that the microwave oven having the rear plate 8 provided with the rear-face projections according to the present invention can more uniformly heat an object in the cavity than the microwave oven having the rear plate 8 with no projection or having the rear plate 8 provided with the projections arranged on the entire surface thereof.

Heating Test 2

(1) Objects to be tested

Microwave ovens were fabricated in accordance with this embodiment, except that only the large-size projection 61 was formed on the ceiling plate 6 and the other projections 62, 71, 81 to 84, 91 and 101 were all eliminated. In these microwave ovens, the distance P between the large-size projection 61 and the boundary line L was variously set. The lateral length of the ceiling plate 6 was 320 mm.

As a reference sample, a microwave oven which was not provided with any projections 61, 62, 71, 81 to 84, 91 and 101 was fabricated.

(2) Test procedure

Mug cups filled with milk were placed in the cavities of the microwave ovens each having the ceiling plate formed with only the large-size projection 61, and heated at a power output of 500 W for 130 seconds. Thereafter, a temperature difference ΔT between the upper and lower portions of the milk filled in each of the mug cups was measured. The relationship between the distance P and the temperature difference ΔT was determined. The result is shown in FIG. 18.

Figure 18:
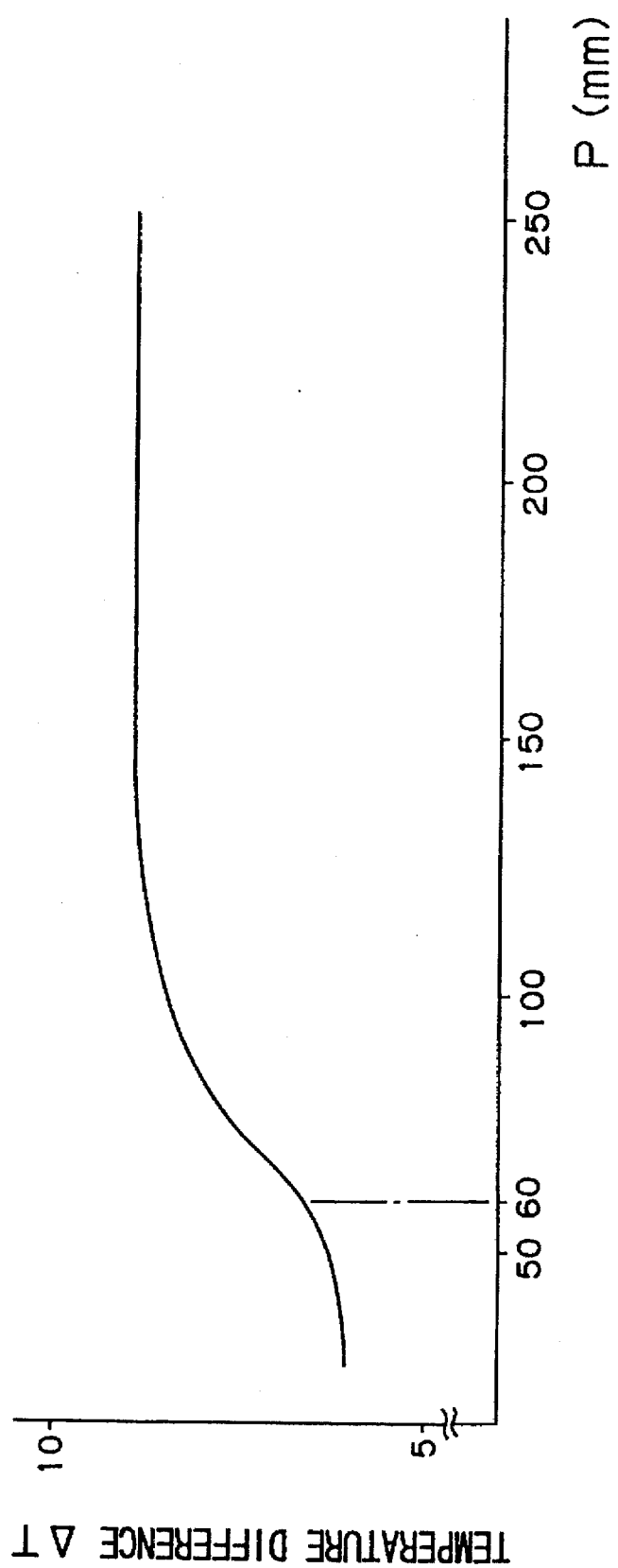
FIG. 18 is a graphic representation illustrating the relationship between the distance P from the large-size projection to the boundary line and the temperature difference between upper and lower portions of milk in a mug cup.

As can be seen from FIG. 18, the temperature difference ΔT was very little when the distance P was not greater than one half the wavelength of the microwaves (60 mm). However, the temperature difference ΔT steeply increased when the distance P exceeded 60 mm, and then leveled at a constant value when the distance P exceeded 120 mm which was equal to the wavelength. This demonstrates that it is preferable to set the distance P between the boundary line L and the large-size projection 61 having a diameter R of one half the wavelength of the microwaves to not greater than one half the wavelength of the microwaves.

As for the microwave oven having no projection on the interior walls, the temperature difference ΔT was substantially the same as the aforesaid constant value.

FIGS. 19 to 27 illustrate rear plates 8A to 8I according to other embodiments of the present invention which are each employed as an alternative to the rear plate 8.

Figure 19:
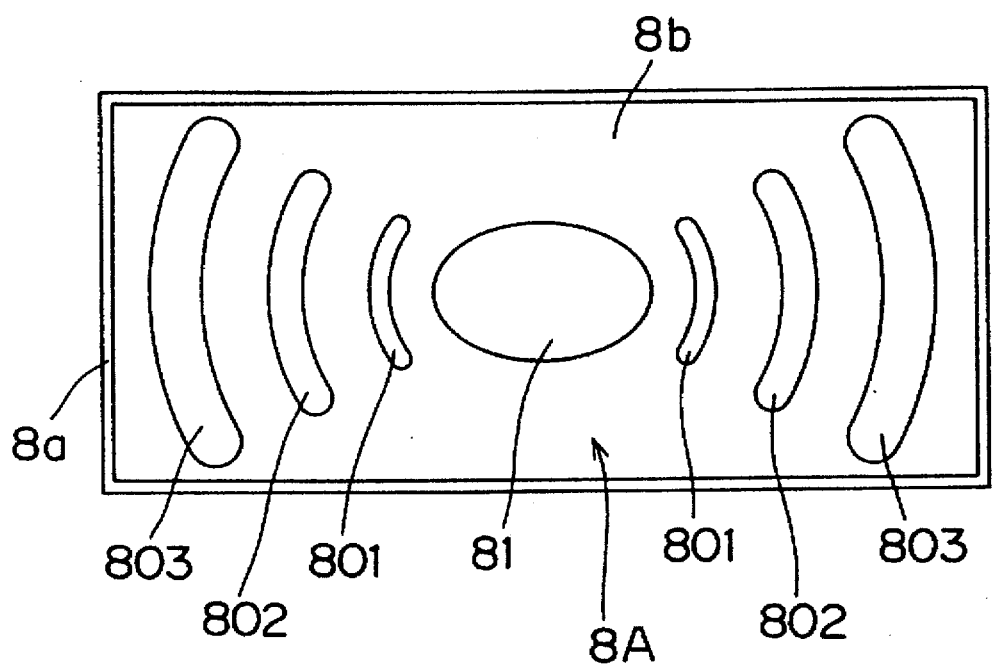
FIG. 19 is a front view of a rear plate in accordance with a second embodiment of the present invention.

A rear plate 8A according to a second embodiment as shown in FIG. 19 has rear-face projections 801, 802 and 803 of arcuate shapes concentrically disposed around a central rear-face projection 81, instead of the rear-face projections 82, 83 and 84 on the rear plate 8 shown in FIG. 12. The projections 801, 802 and 803 are each formed into a vertically elongated and outwardly curved shape having no angularity as viewed from the front side. The use of the rear-face plate 8A shown in FIG. 19 also presents the aforesaid advantages (1) to (5), like the rear plate 8 shown in FIG. 12.

Figure 20:
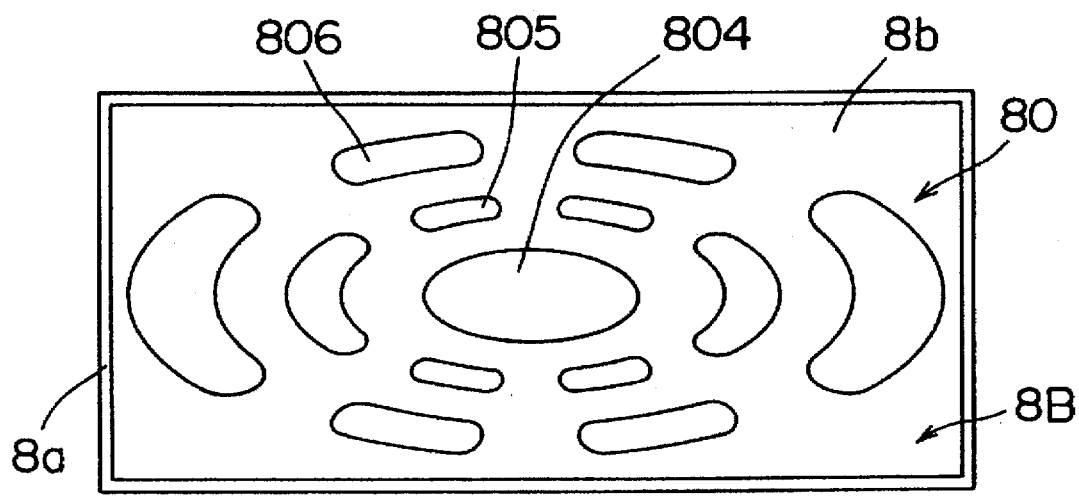
FIG. 20 is a front view of a rear plate in accordance with a third embodiment of the present invention.

A rear plate 8B according to a third embodiment as shown in FIG. 20 has rear-face projections 805 and 806 disposed around an elliptical central rear-face projection 804 along contours of ellipses similar in shape to the central projection 804, instead of the rear-face projections 82, 83 and 84 on the rear plate 8 shown in FIG. 12. The central projection 804 is formed into a semi-ellipsoidal surface flatter than the central projection 81 on the rear plate 8 shown in FIG. 12. The projections 805 and 806 extend along the contours of the ellipses similar in shape to the central projection 804. The projections 806 are disposed outside the projections 805. The lateral lengths a and b of the projections 805 and 806 disposed on the right and left sides of the central projection 804 are greater than vertical lengths c and d of the projections 805 and 806 disposed on the upper and lower sides of the central projection 804. The use of the rear plate 8B shown in FIG. 20 also presents the aforesaid advantages (1) to (5), like the rear plate 8 shown in FIG. 12.

Figure 21:
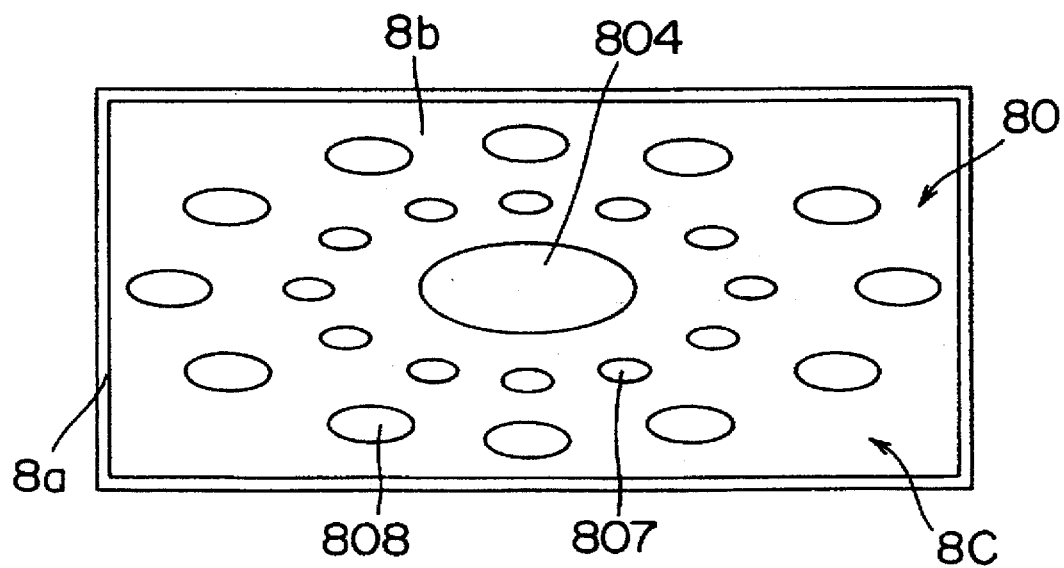
FIG. 21 is a front view of a rear plate in accordance with a fourth embodiment of the present invention.

A rear plate 8C according to a fourth embodiment as shown in FIG. 21 has rear-face projections 807 and 808 disposed around an elliptical central rear-face projection 804 along contours of ellipses similar in shape to the central projection 804. These rear-face projections 807 and 808 are each formed into a semi-ellipsoidal surface, and the projections 808 are larger than the projections 807 and smaller than the central projection 804. The use of the rear plate 8C shown in FIG. 21 also presents the aforesaid advantages (1) to (5), like the rear plate 8 shown in FIG. 12.

Figure 22:
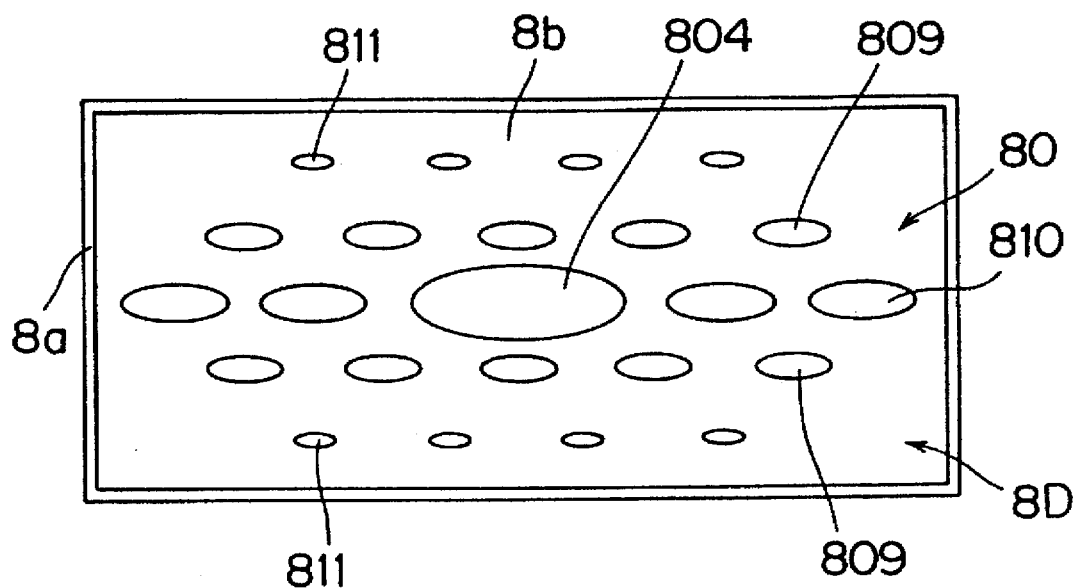
FIG. 22 is a front view of a rear plate in accordance with a fifth embodiment of the present invention.

A rear plate 8D according to a fifth embodiment as shown in FIG. 22 has a plurality of rear-face projections 810 laterally disposed in a row on the right and left sides of a central projection 804, rear-face projections 809 laterally disposed in rows on the upper and lower sides of the row of the projections 804 and 810, and rear-face projections 811 laterally disposed in rows on the upper side of the upper row of the projections 809 and on the lower side of the lower row of the projections 809. These projections are each formed into a laterally elongated semi-ellipsoidal surface. The projections 810 in the central region with respect to the vertical direction of the rear plate 8 are larger than the projections 809, which are larger than the projections 811. A rear-face projection group 80 including these projections 804, 810, 809 and 811 is configured into a laterally elongated ellipse. The use of the rear plate 8D shown in FIG. 22 also presents the aforesaid advantages (1) to (5), like the rear plate 8 shown in FIG. 12.

Figure 23:
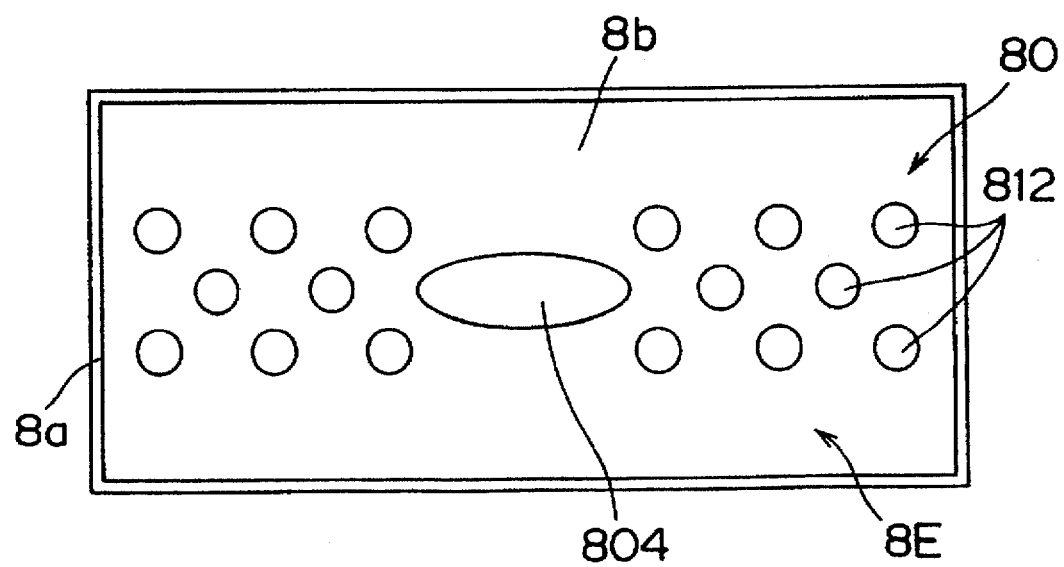
FIG. 23 is a front view of a rear plate in accordance with a sixth embodiment of the present invention.

A rear plate 8E according to a sixth embodiment as shown in FIG. 23 has rear-face projections 812 laterally disposed in three rows on the right and left sides of a central rear-face projection 804. The projections 812 are each formed into a semi-spherical surface. The use of the rear plate 8E shown in FIG. 23 also presents the aforesaid advantages (1) to (5), like the rear plate 8 shown in FIG. 12.

Figure 24:
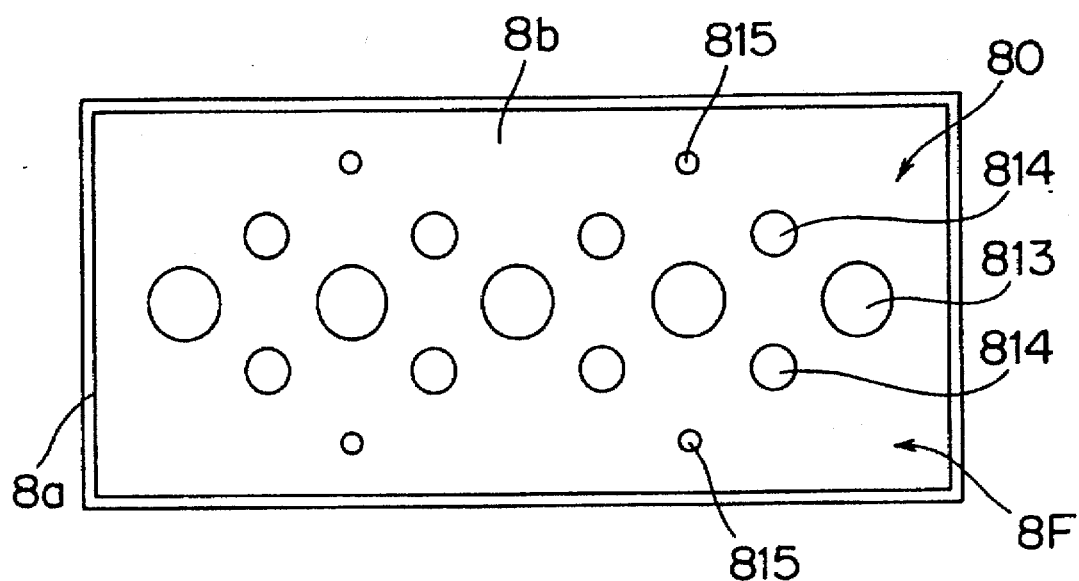
FIG. 24 is a front view of a rear plate in accordance with a seventh embodiment of the present invention.

A rear plate 8F according to a seventh embodiment as shown in FIG. 24 has rear-face projections 813 laterally disposed in a row in a central region with respect to the vertical direction thereof, rear-face projections 814 laterally disposed in rows on the upper and lower sides of the central row of the projections 813, two rear-face projections 815 laterally disposed in a row on the upper side of the upper row of the projections 814 and two rear-face projections 815 laterally disposed in a row on the lower side of the lower row of the projections 814. These projections 813, 814 and 815 are each formed into a semi-spherical surface. The use of the rear plate 8F shown in FIG. 24 presents the advantages (1) and (3) to (5) among the aforesaid advantages presented by the rear plate 8 shown in FIG. 12.

Figure 25:
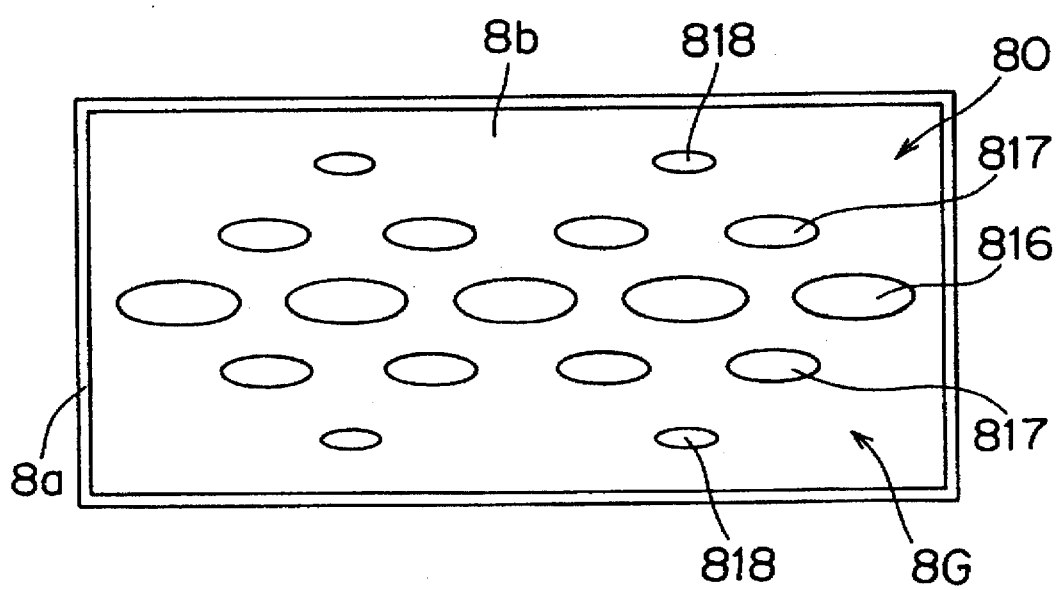
FIG. 25 is a front view of a rear plate in accordance with an eighth embodiment of the present invention.

A rear plate 8G according to an eighth embodiment as shown in FIG. 25 has substantially the same projection arrangement as the rear plate 8F shown in FIG. 24, except that the rear-face projections 813, 814 and 815 each having a semi-spherical surface are replaced with rear-face projections 816, 817 and 818 each having a laterally elongated semi-ellipsoidal surface. The use of the rear plate 8G shown in FIG. 25 presents the advantages (1) and (3) to (5) among the aforesaid advantages presented by the rear plate 8 shown in FIG. 12.

Figure 26:
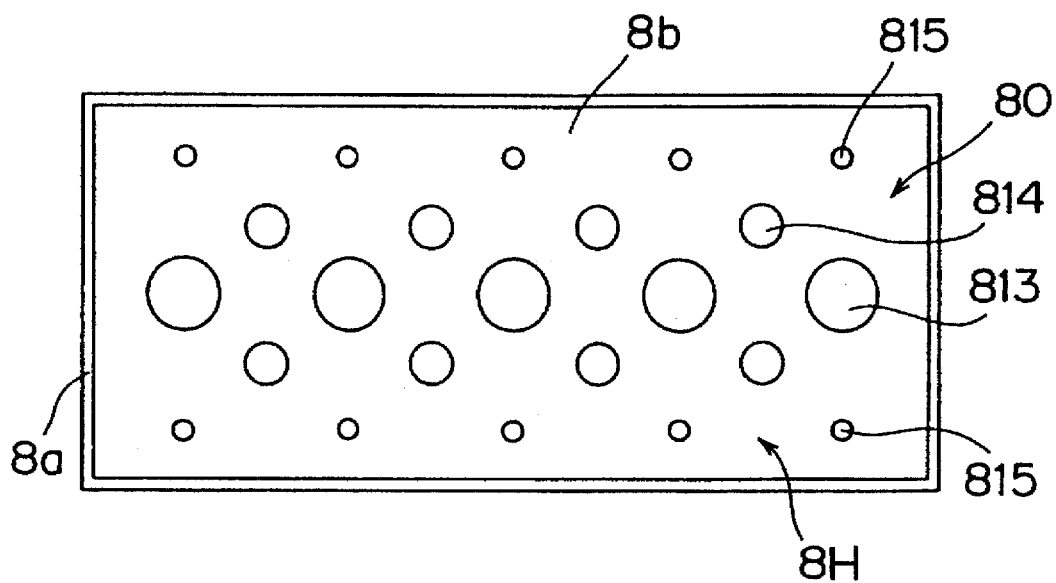
FIG. 26 is a front view of a rear plate in accordance with a ninth embodiment of the present invention.

A rear plate 8H according to a ninth embodiment as shown in FIG. 26 has substantially the same projection arrangement as that of the rear plate 8F shown in FIG. 24, except that the number of the rear-face projections 815 disposed in each of the lower and upper rows is not two but five. This embodiment presents the advantages (1) and (3) to (5) among the aforesaid advantages presented by the rear plate 8 shown in FIG. 12.

Figure 27:
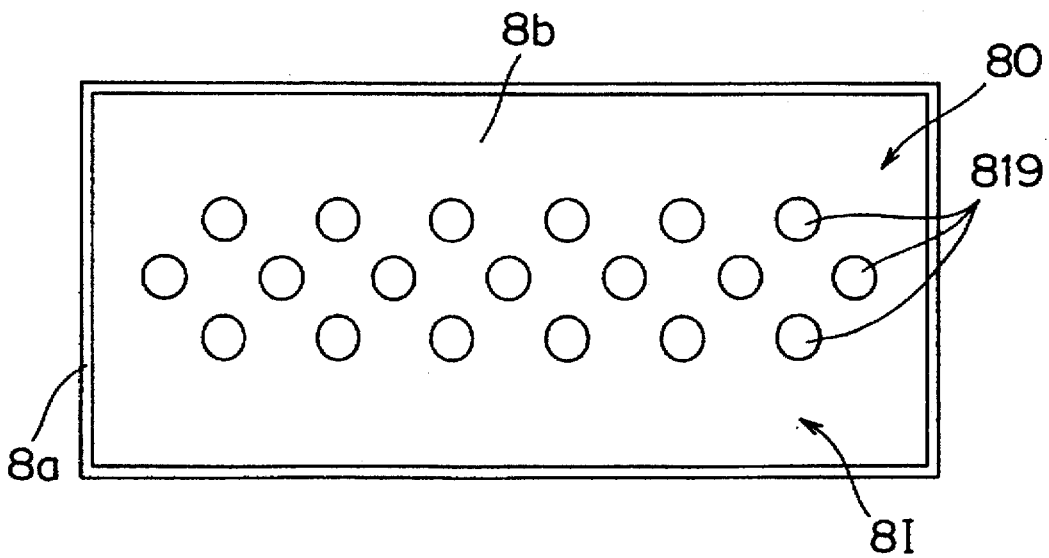
FIG. 27 is a front view of a rear plate in accordance with a tenth embodiment of the present invention.

A rear plate 8I according to a tenth embodiment as shown in FIG. 27 has rear-face projections 819 laterally disposed in three rows in a central region with respect to the vertical direction thereof and each having a semi-spherical surface. This embodiment also presents the advantages (1) and (3) to (5) among the aforesaid advantages presented by the rear plate shown in FIG. 12.

The arrangement of the rear plate is not limited to those of the aforesaid embodiments. For example, the shape of the rear-face projections is not limited to a semi-ellipsoidal surface or a semi-spherical surface, but may be any convexly curved surface such as a paraboloidal surface having neither step nor angularity.

The arrangement of the rear-face projections on the rear plate is not limited to those of the aforesaid embodiments. It is sufficient that the occupancy rate of the rear-face projections in a horizontal line is relatively large in a central region with respect to the vertical direction and smaller in a region upwardly or downwardly more distant from the central region.

Where the cavity 2 is of a vertically elongated shape, a vertically elongated projection arrangement is, of course, employed which may be obtained by rotating the laterally elongated projection arrangement employed in the aforesaid embodiments by an angle of 90°.

FIGS. 28 to 32 illustrate ceiling plates 6A to 6E according to further other embodiments of the present invention which are to be employed instead of the ceiling plate 6 of the first embodiment.

Figure 28:
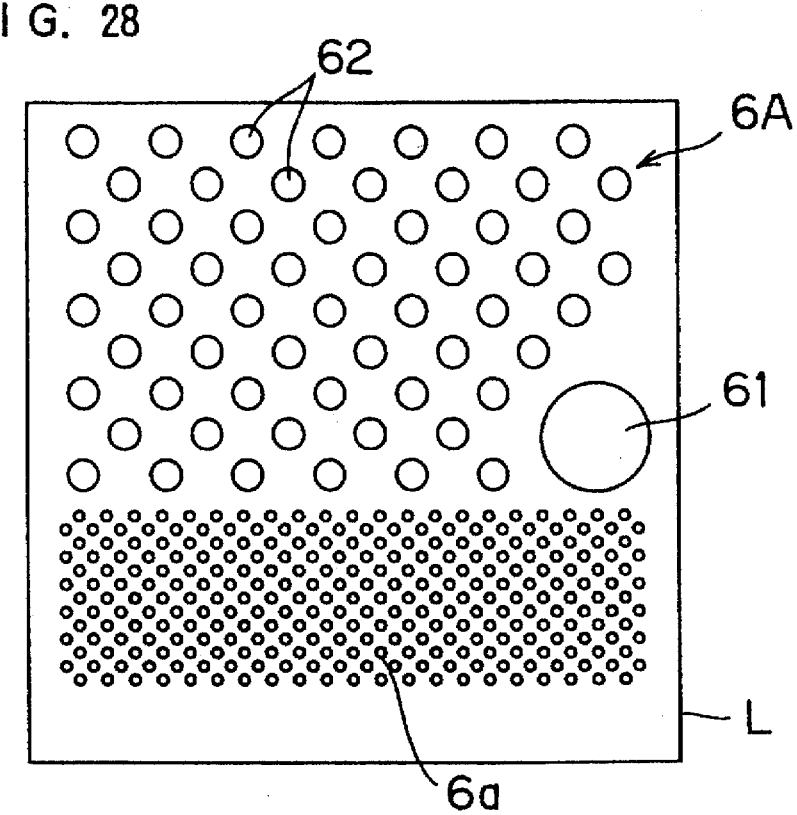
FIG. 28 is a front view of a ceiling plate in accordance with an eleventh embodiment of the present invention.

A ceiling plate 6A according to an eleventh embodiment shown in FIG. 28 has a single perforation portion 6a formed in a rear region thereof, unlike the ceiling plate 6 according to the first embodiment in which a pair of perforation portions 6a are formed in front and rear regions thereof. In this embodiment, small-size projections 62 are dispersedly arranged in a front region of the ceiling plate 6A.

Figure 29:
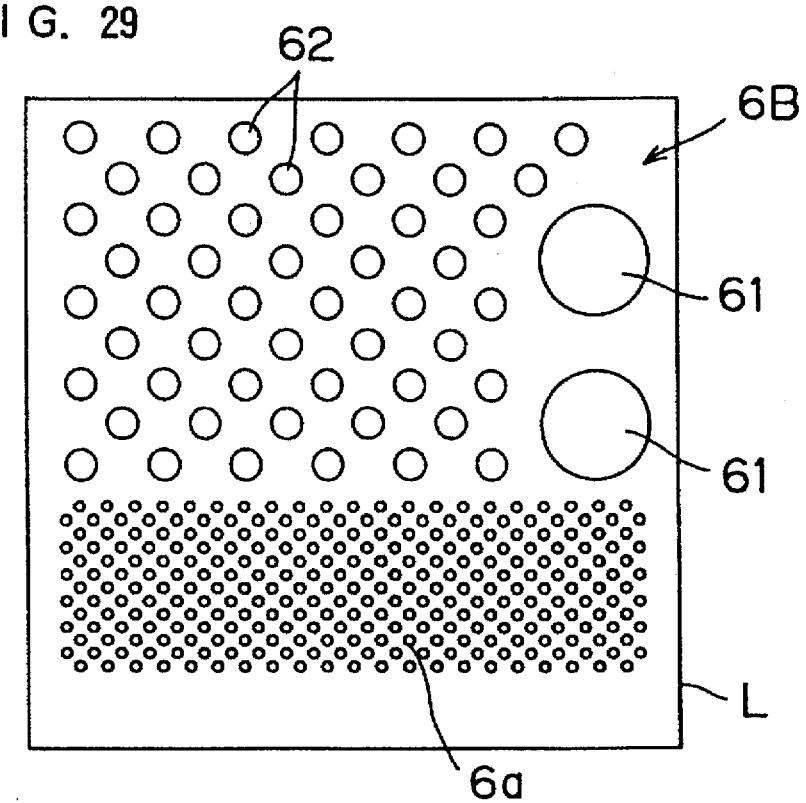
FIG. 29 is a front view of a ceiling plate in accordance with a twelfth embodiment of the present invention.

A ceiling plate 6B according to a twelfth embodiment shown in FIG. 29 is substantially the same as the ceiling plate 6A shown in FIG. 28, except that two large-size projections 61 are disposed in tandem.

Figure 30:
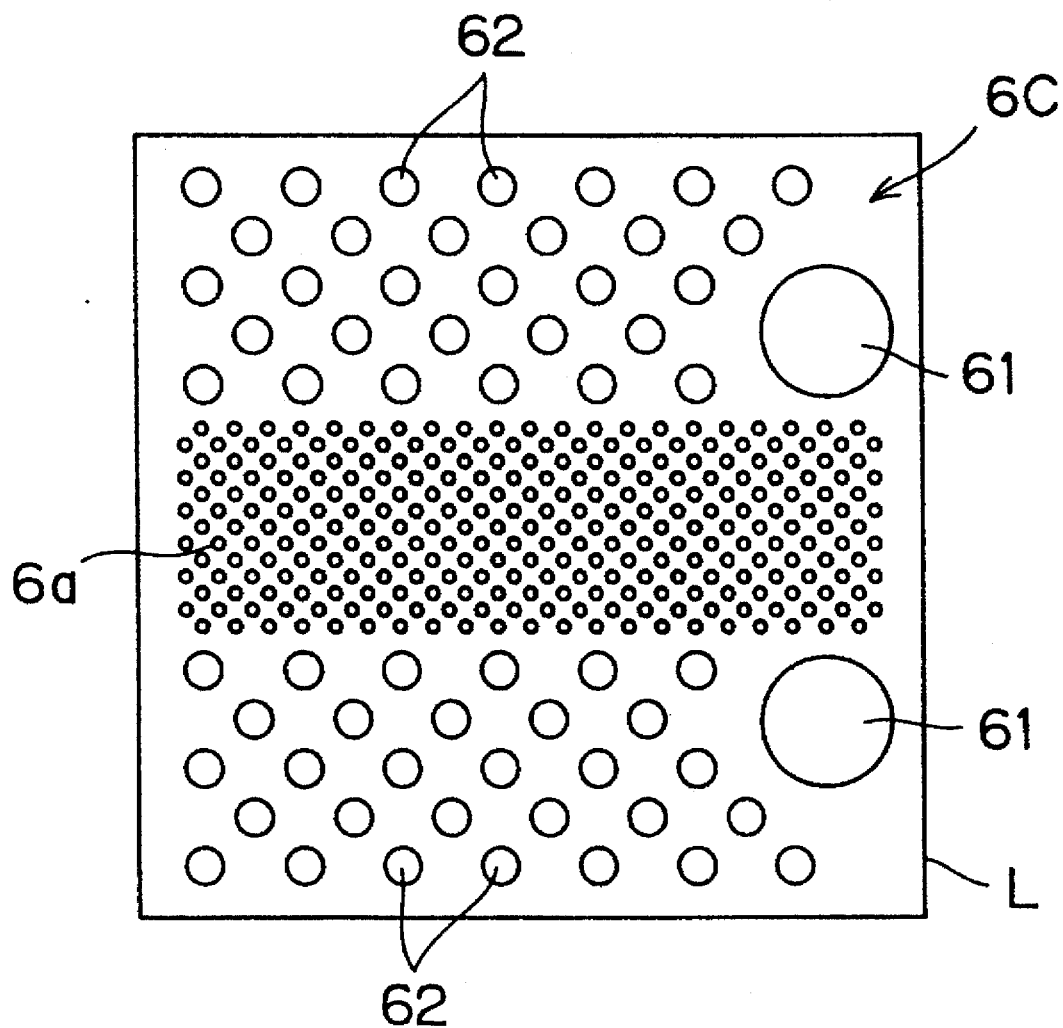
FIG. 30 is a front view of a ceiling plate in accordance with a thirteenth embodiment of the present invention.

A ceiling plate 6C according to a thirteenth embodiment shown in FIG. 30 has a single perforation portion 6a formed in a central region along the lateral axis thereof, two large-size projections 61 respectively formed in regions on the front and rear sides of the perforation portion 6a, and small-size projections 62 dispersedly arranged in the rest of the front and rear regions. In this embodiment, the formation of these two large-size projections 61 allows uniform heating.

Figure 31:
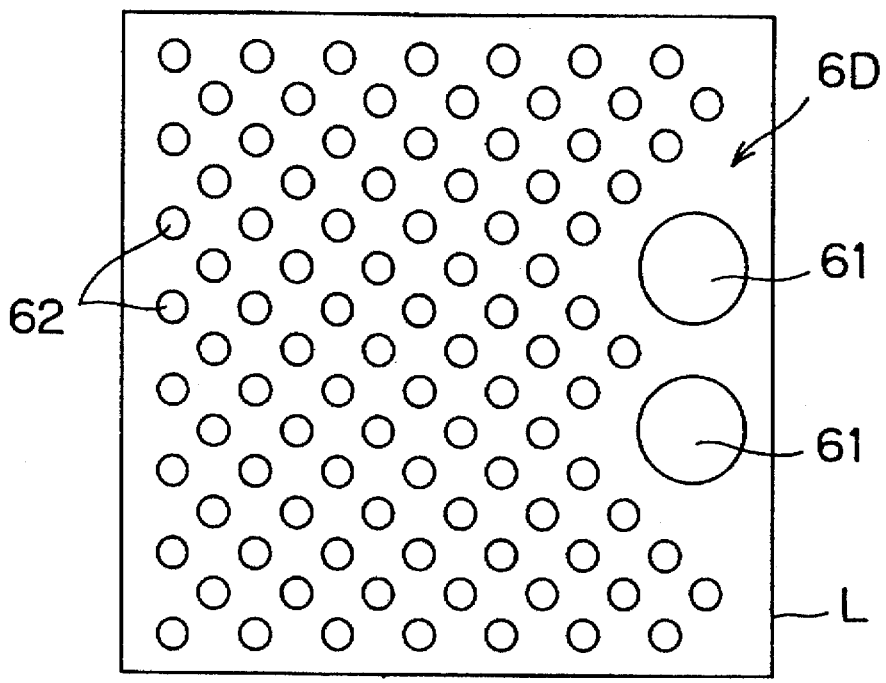
FIG. 31 is a front view of a ceiling plate in accordance with a fourteenth embodiment of the present invention.

A ceiling plate 6D according to a fourteenth embodiment shown in FIG. 31 has no perforation portion 6a, but has two large-size projections 61 formed thereon in tandem and a plurality of small-size projections 62 dispersedly arranged on the entire surface thereof except the positions in which the large-size projections are formed. In this embodiment, the formation of these two large-size projections allows uniform heating. This ceiling plate 6D is suitable for a microwave oven which does not have an infrared heater 15 above the ceiling plate.

Figure 32:
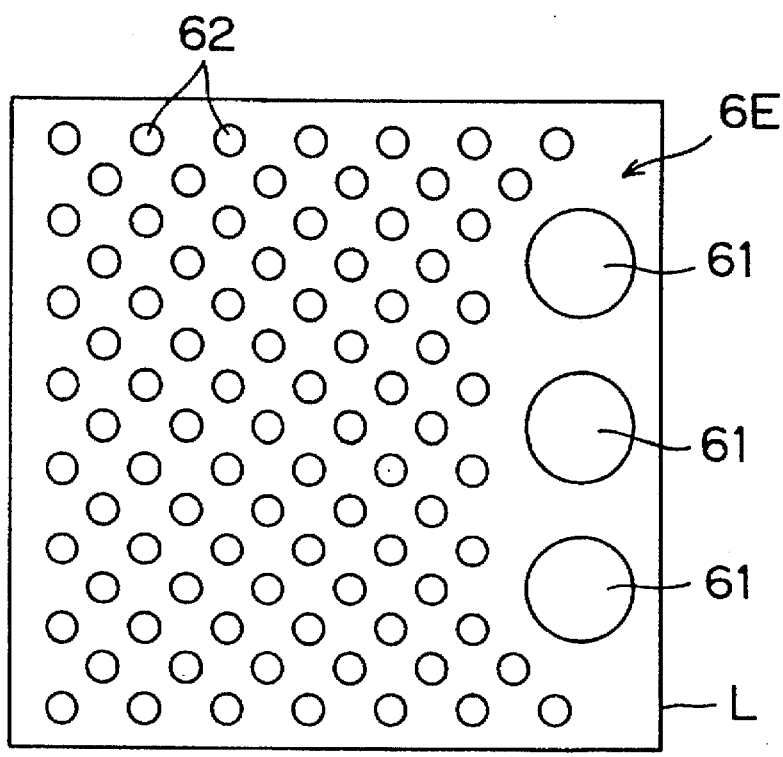
FIG. 32 is a front view of a ceiling plate in accordance with a fifteenth embodiment of the present invention.

A ceiling plate 6E according to a fifteenth embodiment shown in FIG. 32 has no perforation portion 6a, but has three large-size projections 61 formed thereon in tandem and a plurality of small-size projections 62 dispersedly arranged on the entire surface thereof except the positions in which the large-size projections are formed. In this embodiment, the formation of these three large-size projections allows uniform heating. This ceiling plate 6D is also suitable for a microwave oven without an infrared heater 15.

The aforesaid large-size projection or projections 61 are not necessarily required to be formed on the interior face of the ceiling plate 6, but may be formed on any partition plate adjacent to that formed with the microwave supplying port 13. Therefore, where the microwave supplying port 13 is formed on the ceiling plate 6, the large-size projections 61 may be formed on any one of the rear plate 8, left side plate 9 and right side plate 10 which are provided adjacent to the ceiling plate 6.

The shape of the aforesaid projections 61 and 62 is not limited to a semi-spherical surface, but may be any convexly curved surface such as a semi-ellipsoidal surface or paraboloidal surface having curvatures in two crossing directions.

Various modifications can be made in the aforesaid embodiments. For example, the small-size projections 62 may be eliminated.

Next, explanation will be given for a microwave oven in accordance with a sixteenth embodiment of the present invention.

Figure 33:
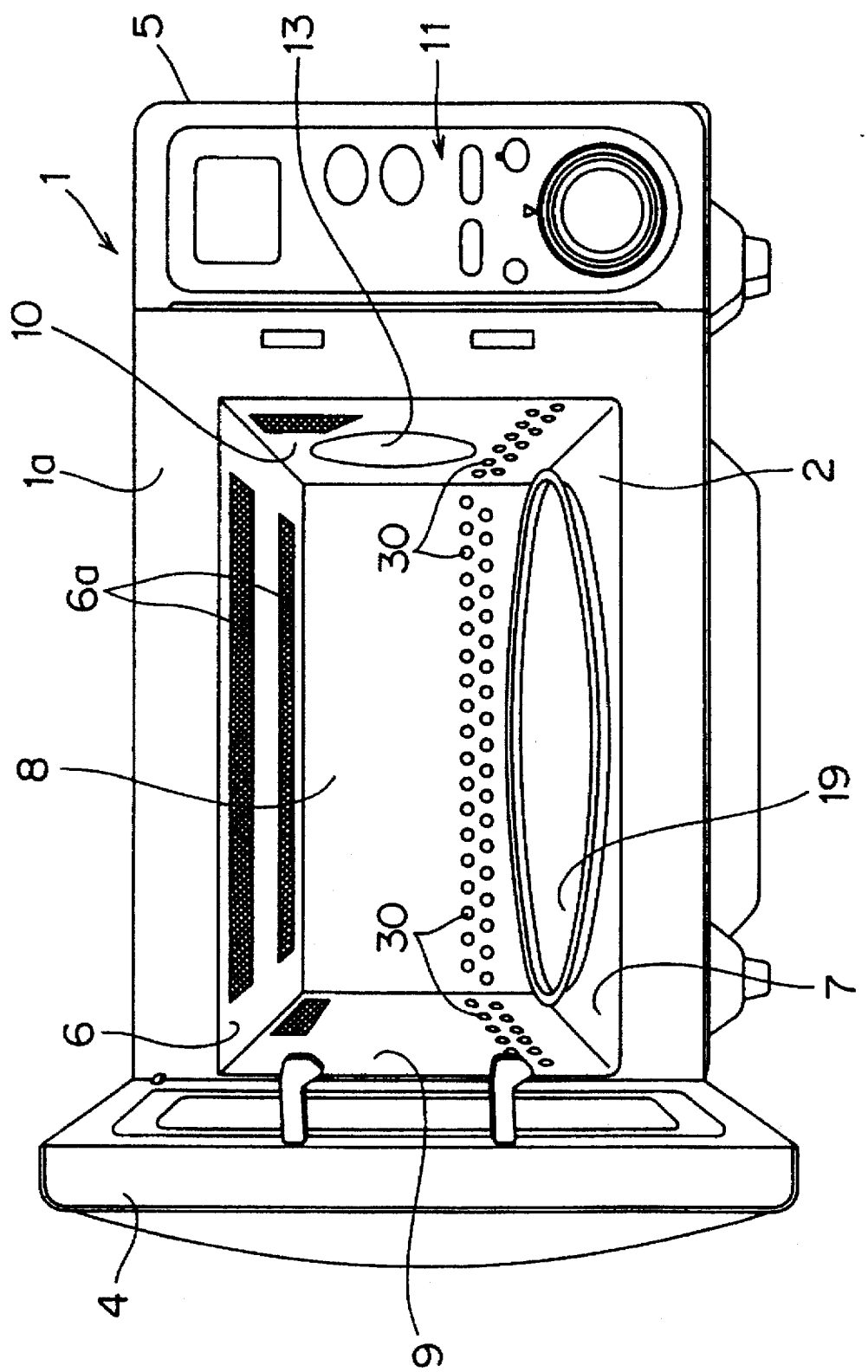
FIG. 33 is a schematic front view of a microwave oven with the door thereof being open in accordance with a sixteenth embodiment of the present invention.
Figure 34:
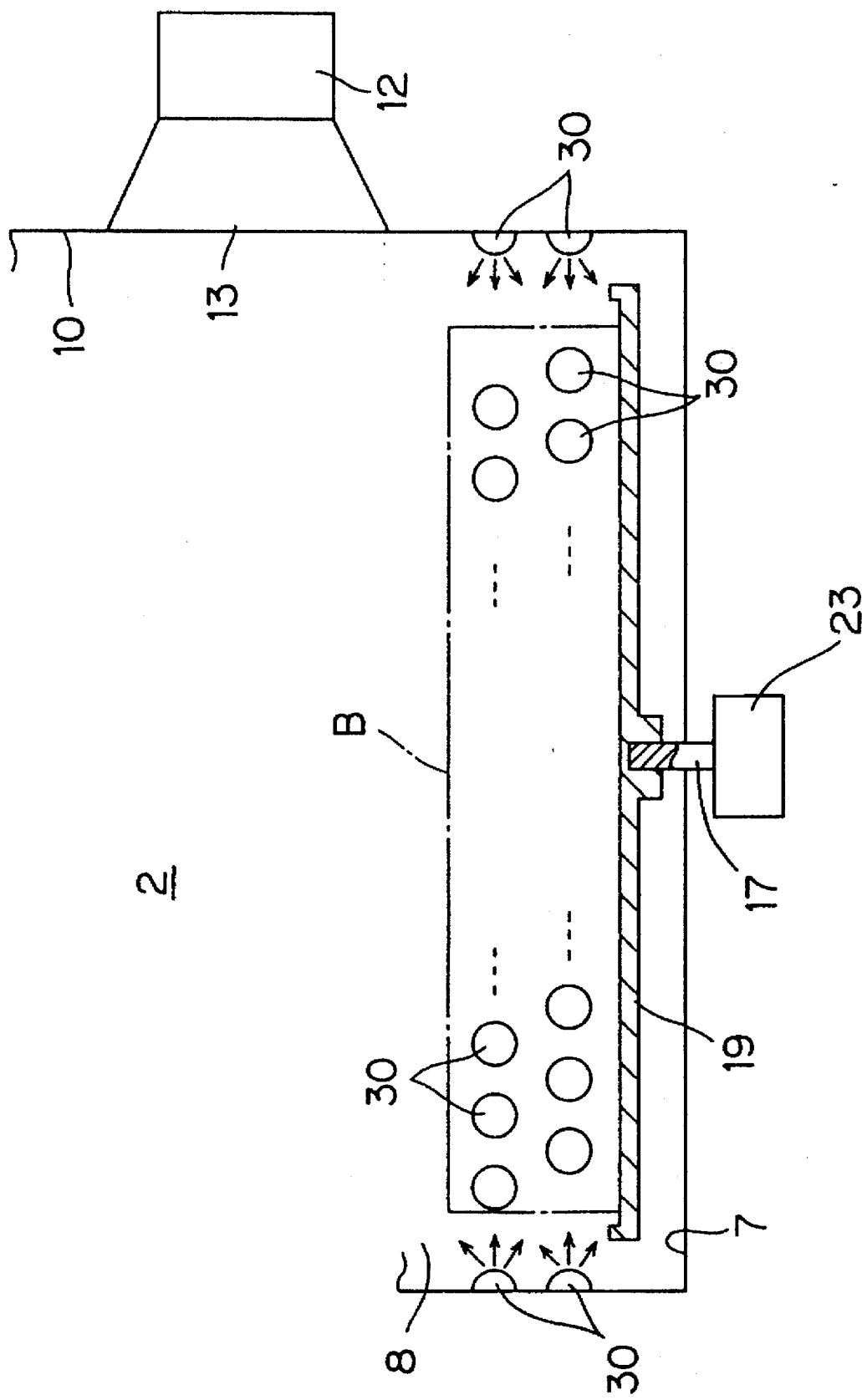
FIG. 34 is a schematic side view illustrating the inside structure of the cavity.

FIG. 33 is a front view of the microwave oven with the door thereof being open. FIG. 34 is a schematic side view illustrating the inside structure of the cavity of the microwave oven. In the explanation for this embodiment, like parts as in the first embodiment are denoted by the same reference numerals and characters.

In this embodiment, a left side plate 9, rear plate 8 and right side plate 10 each have a plurality of projections 30 formed thereon in two rows in a region in the vicinity of the upper surface of the pan 19 around a space B to be occupied by an object to be heated. The projections 30 each having a semi-spherical surface are dispersedly arranged so as not to contact each other.

Figure 35:
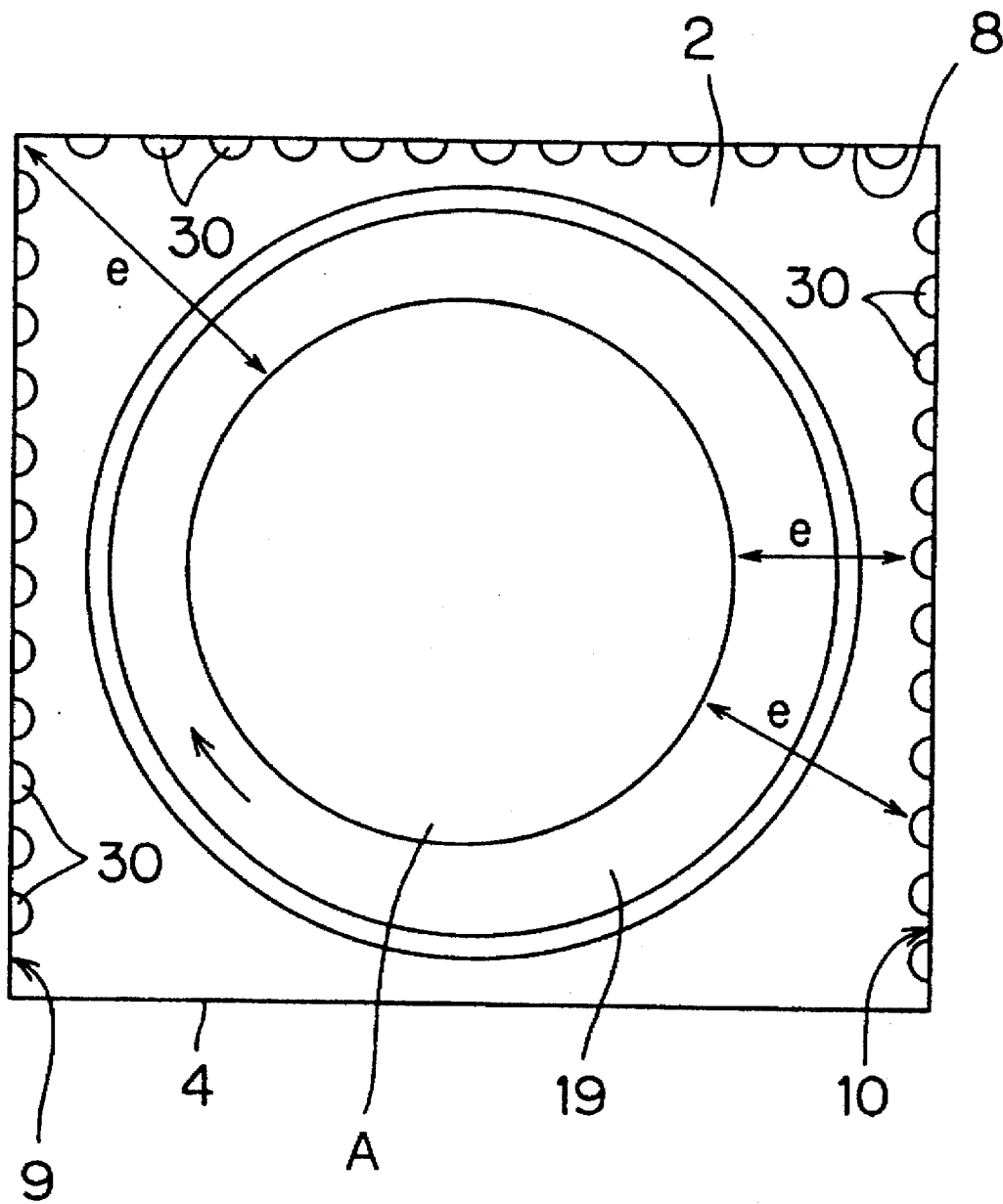
FIG. 35 is a schematic plan view of the cavity.
Figure 36:
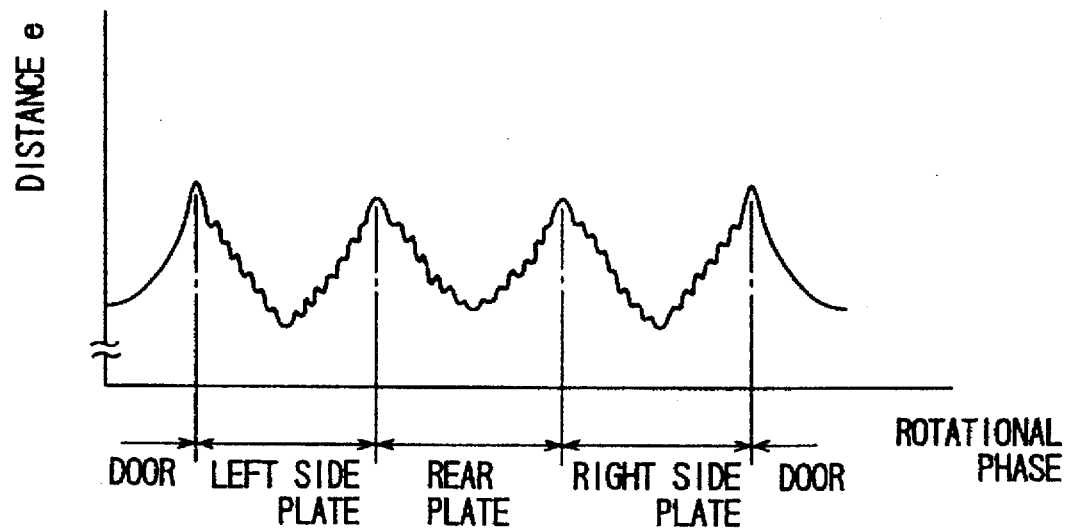
FIG. 36 is a graphic representation illustrating the relationship between the distance from an object placed on a pan to the side and rear plates and door, and the rotational phase of the pan.

As shown FIG. 35, the distance e between the object A placed on the pan 19 and the door 4, left side plate 9, rear plate 8 or right side plate 10 surrounding the object A changes in accordance with the rotational phase of the pan 19. The relationship between the distance e and the rotational phase is shown in FIG. 36. If the interior surface of the cavity has no projection, the distance between the object and the interior surface changes with respect to the rotational phase of the pan as shown in FIG. 37. As can be understood from a comparison of FIGS. 36 and 37, the distance e between the object A and the left side plate 9, rear plate 8 or right side plate 10 is frequently fluctuated due to the projections 30. In this embodiment, the pan 19 is rotated clockwise as viewed from the top.

In accordance with this embodiment, the object space B is surrounded by the projections 30 forming an undulation band on the rear plate 8 and side plates 9 and 10. Therefore, the distance between the object A and the left side plate 9, rear plate 8 or right side plate 10 is frequently fluctuated in accordance with the rotation of the pan 19, allowing the object A to be subjected to frequently alternated high-intensity and low-intensity microwave radiations. Thus, the object A can be uniformly heated.

In particular, the undulation band formed of the projections 30 significantly improves the microwave distribution efficiency, thereby ensuring more uniform heating of the object A. The semi-spherical surface of the projections 30 further enhances the microwave distribution efficiency, thereby ensuring still more uniform heating.

The shape of the projections 30 forming the undulation band is not limited to a semi-spherical surface, but may be any convexly curved surface such as a semi-ellipsoidal surface or paraboloidal surface having neither step nor angularity. Alternatively, the undulation band may be of a wavy shape undulated only in relation to the rotational direction of the pan 19. Further, the undulation band may be formed of depressions and projections.

The formation of undulations on at least one of the rear plate 8, left side plate 9 and right side plate 10 may achieve sufficient effect.

Although the present invention has been described in detail by way of the embodiments thereof, it should be understood that the foregoing disclosure is merely illustrative of the technical principles of the present invention but not limitative of the same. The spirit and scope of the present invention are to be limited only by the terms of the appended claims.

What is claimed is:

1. A microwave oven, comprising:

partition plates having interior surfaces defining a cavity for accommodating an object to be heated;

a microwave generator for supplying microwaves into the cavity; and a plurality of projections projecting from at least one of the interior surfaces into the cavity for reflecting microwaves supplied by the microwave generator to distribute supplied microwaves within the cavity, the plurality of projections being dispersed on the at least one interior surface of the partition plates such that neighboring projections do not contact each other, the projections including a largest projection in an area of the at least one interior surface and plural other projections disposed in the area, the largest projection being located at the center of the area and the plural projections being arranged in at least first and second groups with respect to the largest projection, the second group having at least two members that are located at a second region spaced at a second distance from the largest projection, and the first group having at least two members that are located at a first region that is spaced from the largest projection by a first distance that is less than the second distance, the members of the first group having a different size than the members of the second group.

2. A microwave oven as set forth in claim 1, wherein the partition plates include a rear plate, and the plurality of projections include at least one rear-face partition plate projection formed on the rear plate.

3. A microwave oven as set forth in claim 2, wherein the rear plate has a rectangular shape, the plurality of projections include a plurality of rear-face projections formed on the rear plate, and an occupancy rate of the rear-face projections, in a cross section taken along a longitudinal direction of the rear plate, is relatively larger in a central region of the rear plate than in regions remote from the central region.

4. A microwave oven as set forth in claim 2, wherein the plurality of rear-face projections include a single central rear-face projection formed in a center of the rear plate, the central rear-face projection being larger than other rear-face projections disposed in a region on the rear plate except the center thereof.

5. A microwave oven as set forth in claim 4, wherein the central rear-face projection disposed in the center of the rear plate is formed into a longitudinally elongated elliptical shape.

6. A microwave oven as set forth in claim 2, wherein the partition plates include a right side plate and a left side plate, the microwave oven further comprising:

guide rails disposed on the right side plate and the left side plate for guiding a tray removably inserted into the cavity; and a positioning abutment member disposed at an edge of the rear plate and adapted to abut against an inserted tray for restricting an insertion position of the tray to establish a clearance for discharge prevention between an apex of each of the rear-face projections and the tray.

7. A microwave oven as set forth in claim 2, wherein the partition plates include a partition plate having a microwave supplying port for microwaves generated and supplied by the microwave generator, the partition plate having the microwave supplying port being disposed adjacent to the rear plate.

8. A microwave oven as set forth in claim 7, wherein the partition plate having the microwave supplying port is a side plate.

9. A microwave oven as set forth in claim 1, wherein the partition plates include a bottom plate, the microwave oven further comprising:

a shaft projecting from a center of the bottom plate and adapted to be rotated by a driving means disposed outside the cavity; and a metallic pan support coupled to the shaft for rotation and adapted to support a pan on which an object to be heated is placed, wherein the plurality of projections include a plurality of bottom-face projections bulged into the cavity and formed on the bottom plate in a region outside a periphery of the pan support as viewed from the top.

10. A microwave oven as set forth in claim 9, wherein the pan is made of a metal, wherein the bottom-face projections are formed only in a region outside a periphery of the pan as viewed from the top.

11. A microwave oven as set forth in claim 9, wherein the pan is made of a nonmetallic material, and is a little larger than the pan support as viewed from the top, wherein the bottom-face projections are formed in regions both inside and outside the periphery of the pan as viewed from the top.

12. A microwave oven as set forth in claim 1, wherein the partition plates include a bottom plate, the microwave oven further comprising:

a shaft projecting from a center of the bottom plate and adapted to be rotated by a driving means disposed outside the cavity; and a pan adapted to be rotated by a rotational force applied thereto from the shaft for supporting an object placed thereon, wherein the plurality of projections include a plurality of undulation forming projections formed on the interior surface of the cavity in the vicinity of an upper surface of the pan around a space to be occupied by an object placed on the pan, the plurality of undulation forming projections forming undulations in relation to a rotational direction of the pan.

13. A microwave oven as set forth in claim 12, wherein the partition plates include a left side plate, a right side plate and a rear plate, wherein the plurality of undulation forming projections are provided on the left side plate, the right side plate and the rear plate.

14. A microwave oven as set forth in claim 1, wherein the microwave generator generates microwaves of a wavelength;

the plurality of partition plates includes a first partition plate having a first face formed with a microwave supplying port for supplying microwaves generated by the microwave generator to the cavity, and a second partition plate having a second face disposed adjacent to the first face; and at least one projection disposed on the second face and bulging into the cavity, and wherein a distance between a boundary line of the first and second faces and a center of the projection disposed on the second face is not greater than one half the wavelength of microwaves generated by the microwave generator.

15. A microwave oven as set forth in claim 14, wherein, in the cavity, the projection disposed on the second face is semi-spherical and is approximately one half the wavelength of microwaves generated by the microwave generator.

16. A microwave oven as set forth in claim 14, wherein the at least one projection disposed on the second face has only a convexly curved surface exposed within the cavity.

17. A microwave oven as set forth in claim 14, further comprising a plurality of second projections bulging into the cavity for reflecting microwaves supplied from the microwave generator to distribute supplied microwaves within the cavity, the plurality of second projections being dispersed on an interior surface of the partition plates facing the cavity such that neighboring projections do not contact each other.

18. A microwave oven as set forth in claim 17, wherein the second projections each have a convexly curved surface exposed within the cavity.

19. A microwave oven as set forth in claim 1, wherein the partition plates include a left side plate and a right side plate, and the plurality of projections include a side projection formed on at least one of the left side plate and the right side plate.

20. A microwave oven as set forth in claim 19, wherein the left and right side plates respectively are provided with guide rails for guiding a tray for thermal-oven heating, such tray being removably insertable into the cavity, and wherein the plurality of projections include a plurality of side-face projections formed on the left and right side plates, the plurality of side-face projections being vertically spaced apart from the guide rails by more than a predetermined distance so as not to contact an inserted tray.

21. A microwave oven as set forth in claim 19, wherein the left and right side plates respectively are provided with guide rails for guiding a tray for thermal-oven heating, such tray being removably insertable into the cavity, and wherein the plurality of projections include a plurality of side-face projections formed on the left and right side plates, the plurality of side-face projections having a projection height such that a distance between apexes of opposite side-face projections respectively formed on the side plates is greater than a lateral length of such tray for thermal-oven heating.

22. A microwave oven as set forth in claim 1, wherein the members of each group of projections have the same size.

23. A microwave oven as set forth in claim 22, wherein all of the members of the first group are between the largest projection and the members of the second group.

24. A microwave oven as set forth in claim 23, including a third group of plural projections arranged in the area such that the members of each of the first and second groups are located between the largest projection and the members of the third group, the members of the third group having a size different from those of each of the first and second groups.

25. A microwave oven as set forth in claim 24, wherein the members of the third group are larger than the members of the second group, and the members of the second group are larger than the members of the first group, and all of the members of all of the groups have only a convexly curved surface exposed within the cavity.

26. A microwave oven as set forth in claim 25, wherein the area covers substantially the entire interior surface of the at least one partition plate.

27. A microwave oven as set forth in claim 26, wherein the at least one partition plate is a rear plate.

28. A microwave oven as set forth in claim 1, wherein the first and second groups have members located on opposing sides of the largest projection.

* * * * *